(12) United States Patent
Hatano et al.

(10) Patent No.: US 8,914,675 B2
(45) Date of Patent: Dec. 16, 2014

(54) CREATING DATA FOR PLAYING BACK TRANSACTIONS

(75) Inventors: Hisanori Hatano, Osaka (JP); Masahiko Kosuda, Tokyo (JP); Mika Shimogawa, Kanagawa (JP); Masafumi Shimotsuji, Kyoto (JP)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 13/591,685

(22) Filed: Aug. 22, 2012

(65) Prior Publication Data

US 2013/0055026 A1 Feb. 28, 2013

(30) Foreign Application Priority Data

Aug. 22, 2011 (JP) .................................. 2011-180995

(51) Int. Cl.
G06F 11/00 (2006.01)
G06F 11/263 (2006.01)
(52) U.S. Cl.
CPC .................................. G06F 11/263 (2013.01)
USPC ............................ 714/32; 714/38.1; 717/124
(58) Field of Classification Search
None
See application file for complete search history.

(56) References Cited

U.S. PATENT DOCUMENTS

| | | | | |
|---|---|---|---|---|
| 5,157,779 A | * | 10/1992 | Washburn et al. | 714/37 |
| 5,542,043 A | * | 7/1996 | Cohen et al. | 714/32 |
| 6,980,916 B1 | * | 12/2005 | Katz et al. | 702/119 |
| 2003/0191987 A1 | * | 10/2003 | Brown | 714/38 |
| 2004/0002996 A1 | * | 1/2004 | Bischof et al. | 707/104.1 |
| 2005/0138104 A1 | * | 6/2005 | Houh et al. | 709/200 |
| 2007/0069005 A1 | * | 3/2007 | Dickerson et al. | 235/379 |

FOREIGN PATENT DOCUMENTS

| | | |
|---|---|---|
| JP | 07245641 A | 9/1995 |
| JP | 10275094 A | 10/1998 |
| JP | 11177655 A | 7/1999 |
| JP | 2001326702 A | 11/2001 |
| JP | 2003006018 A | 1/2003 |
| JP | 2005100344 A | 4/2005 |
| JP | 2005516305 A | 6/2005 |
| JP | 2005286840 A | 10/2005 |
| JP | 2006174173 A | 6/2006 |
| JP | 2007200028 A | 8/2007 |
| JP | 2008257676 A | 10/2008 |
| JP | 2010205011 A | 9/2010 |

* cited by examiner

*Primary Examiner* — Gabriel Chu
(74) *Attorney, Agent, or Firm* — Cantor Colburn LLP; Terry Carroll

(57) ABSTRACT

Playback data is created for testing a server. Recorded data that includes transactions executed in a session established between a client and a server at a designated point in time is extracted. A reduction process that includes deleting data related to certain transactions from the extracted recorded data is performed. The certain transactions are part of a specific transaction group which includes transactions that were executed on or before the designated point in time and includes a transaction that was executed without requiring the execution of a predetermined prior transaction. The playback data is output.

20 Claims, 15 Drawing Sheets

FIG. 2

| | | Transaction | Type |
|---|---|---|---|
| Login | ▶▶ ◀◀ | Login | LS |
| | ▶▶ ◀◀ | Main Menu | SI |
| Tran-A | ▶▶ ◀◀ | Tran-A | SS |
| | ▶▶ ◀◀ | Help | OR |
| | ▶▶ ◀◀ | Tran-A | SS |
| | ▶▶ ◀◀ | Main Menu | SI |
| Tran-B | ▶▶ ◀◀ | Tran-B | SS |
| | ▶▶ ◀◀ | Sub Menu 1 | SI |
| Tran-C | ▶▶ ◀◀ ▶▶ ◀◀ | Tran-C | SS |
| | ▶▶ ◀◀ | Sub Menu 2 | SI |
| Tran-D | ▶▶ ◀◀ | Tran-D | SS |
| | ▶▶ ◀◀ | Main Menu | SI |
| Logout | ▶▶ ◀◀ ▶▶ ◀◀ | Logout | LS |

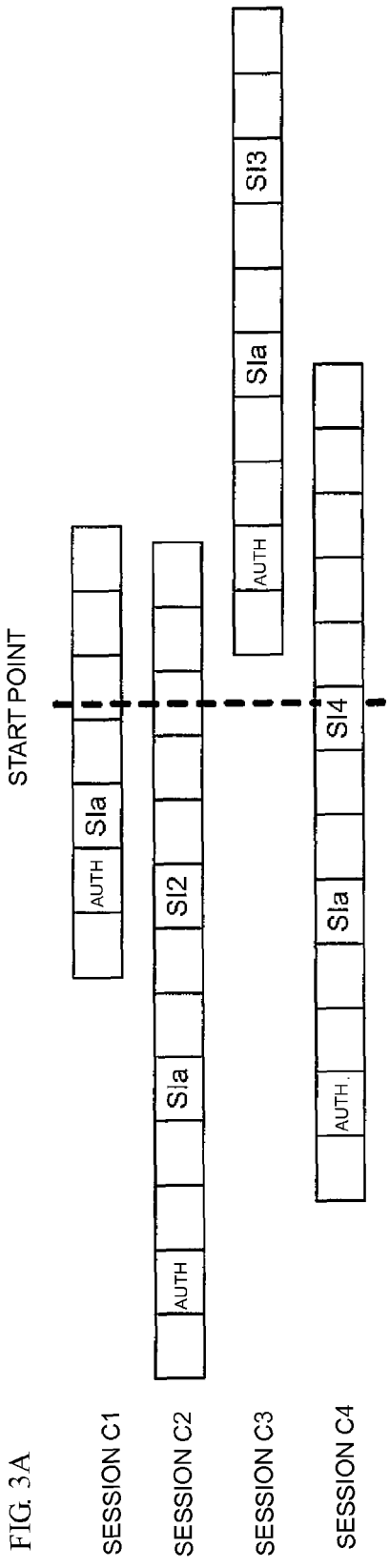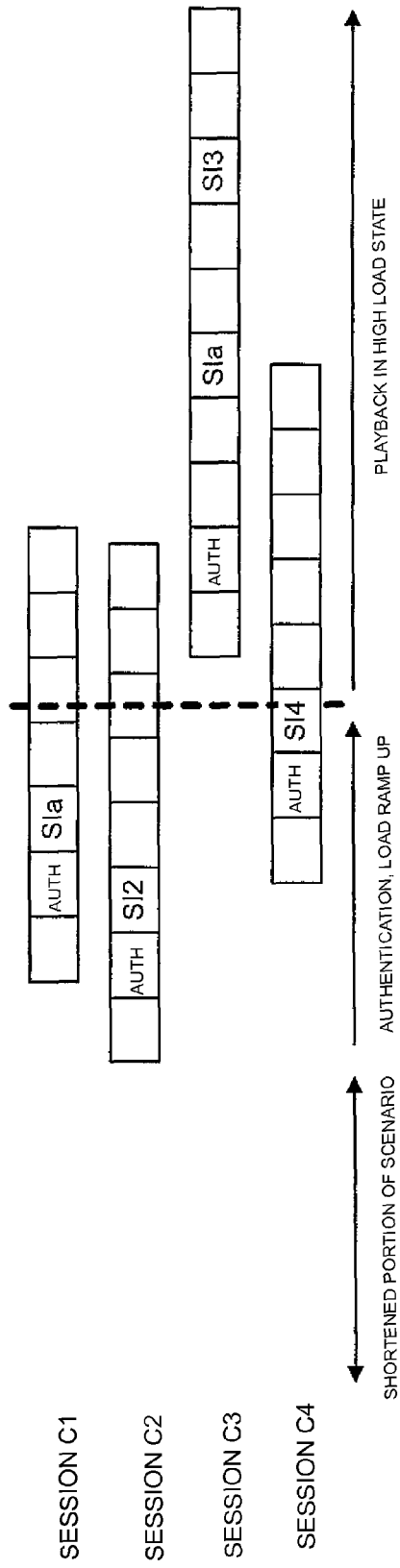

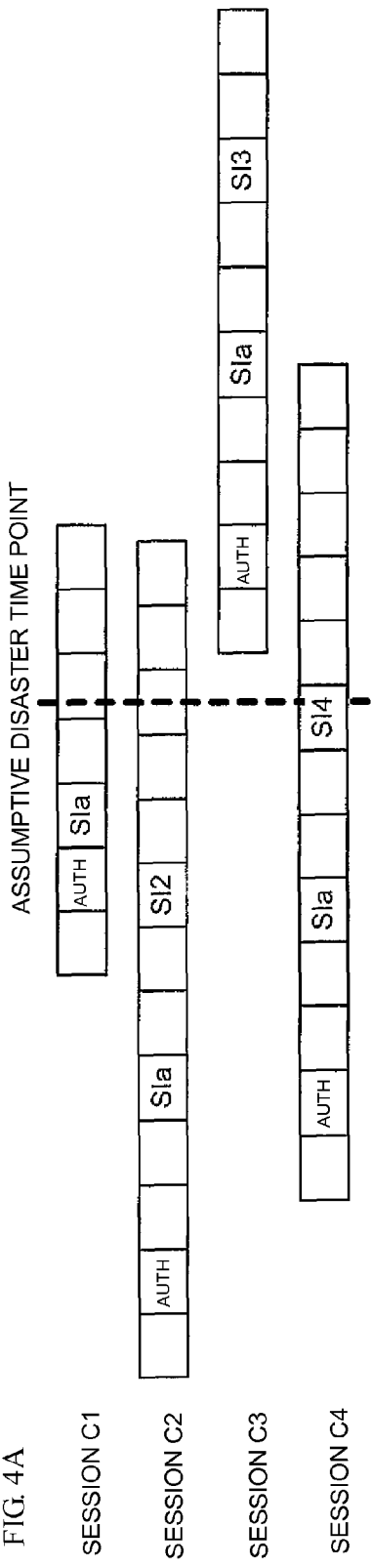
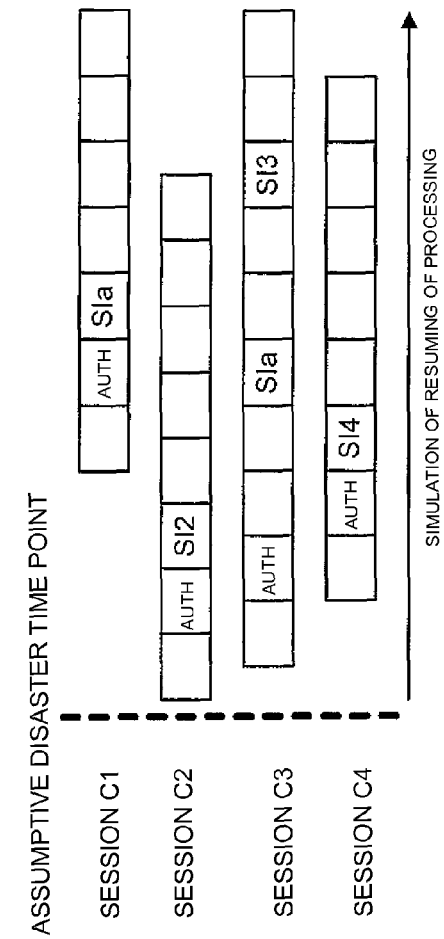
FIG. 4A
FIG. 4B

| | 1 | 2 | 3 | 4 | 5 | 6 | 7 | 8 | 9 |
|---|---|---|---|---|---|---|---|---|---|
| USER A | URLx | LOGIN | URL1 | URL11 | URL19 | URL4 | URL41 | URL42 | URL1 |
| USER B | | LOGIN | URL0 | URL2 | URL22 | URL4 | URL5 | URL51 | URL52 | URL53 |
| USER C | | LOGIN | URL0 | URL00 | URL4 | URL41 | URL42 | URL4 | URL9 | URL90 | URL91 |
| USER D | | LOGIN | URL0 | URL90 | URL91 | URL94 | URL4 | URL41 | URL42 | URL43 | URL1 |
| USER E | URLy | LOGIN | URL0 | URL80 | URL87 | URL94 | URL4 | URL41 | URL42 | URL43 |

|  | # OF TRANSITION SOURCE | # OF TRANSITION DESTINATION SCREENS | # OF APPEARANCES | SHORTEST SCREEN TRANSITION INFORMATION | | |
|---|---|---|---|---|---|---|
|  |  |  |  | MINIMUM # OF TRANSITION SCREENS | SHORTEST SCREEN TRANSITIONS | INEQUALITY FLAG |
| URL0 | 1 | 5 | 5 | 1 | xxxxxxx | 0 |
| URL00 | 1 | 1 | 1 | 2 | xxxxxxx | 0 |
| URL1 | 3 | 1 | 3 | 2 | xxxxxxx | 0 |
| URL2 | 1 | 1 | 1 | 2 | xxxxxxx | 0 |
| URL80 | 1 | 1 | 1 | 2 | xxxxxxx | 0 |
| URL90 | 2 | 1 | 2 | 2 | xxxxxxx | 0 |
| URL11 | 1 | 1 | 1 | 3 | xxxxxxx | 0 |
| URL22 | 1 | 1 | 1 | 3 | xxxxxxx | 0 |
| URL87 | 1 | 1 | 1 | 3 | xxxxxxx | 0 |
| URL4 | 5 | 3 | 6 | 3 | xxxxxxx | 0 |
| URL91 | 1 | 1 | 2 | 3 | xxxxxxx | 0 |
| URL94 | 2 | 1 | 2 | 4 | xxxxxxx | 0 |
| URL19 | 1 | 1 | 1 | 4 | xxxxxxx | 0 |
| URL41 | 1 | 1 | 4 | 4 | xxxxxxx | 3 |
| URL42 | 1 | 3 | 4 | 5 | xxxxxxx | 3 |
| URL5 | 1 | 1 | 1 | 5 | xxxxxxx | 0 |
| URL51 | 1 | 1 | 1 | 6 | xxxxxxx | 0 |
| URL52 | 1 | 1 | 1 | 7 | xxxxxxx | 0 |
| URL9 | 1 | 1 | 1 | 7 | xxxxxxx | 0 |
| URL43 | 1 | 1 | 2 | 8 | xxxxxxx | 1 |
| URL53 | 1 | 0 | 1 | 8 | xxxxxxxx | 0 |

FIG. 10

CREATING DATA FOR PLAYING BACK TRANSACTIONS

PRIORITY

This application claims priority to Japanese Patent Application No. 2011-180995, filed 22 Aug. 2011, and all the benefits accruing therefrom under 35 U.S.C. §119, the contents of which in its entirety are herein incorporated by reference.

BACKGROUND

The present invention relates to creating data for playing back transactions. In particular, the present invention relates to creating data for playing back previously executed transactions to use as input for testing a server.

Web application systems may be subject to capture/playback type load testing using actual data. Conventionally, such load testing is performed on a copy of a database (DB) that was made at a given time point (hereinafter, referred to as a "start point" or "starting point"), and then actual data from previously executed transactions at and after the start point is played back and applied to a test target system. Standby backup systems constructed as disaster recovery sites for web application systems are also subjected to operation verification tests using actual data.

In a disaster recovery environment, a disaster recovery system copies a DB from a production system to a backup system, and if the production system stops working, the backup system is activated and takes over the production system's processing.

In order to test whether such a backup system operates without fail, the copying of a DB from a production system is halted at a time point set for the testing (hereinafter, referred to as "assumptive disaster time point"), and thereafter a check is made to determine whether the backup system can continue to process end user requests.

Conventionally, testing with two independent phases has been performed, including testing the DB copy function and testing the backup system. For testing the DB copy function, since the copy from the production system is the target of the test, the actual data that is copied is used in integration testing. For testing the backup system, there is a constraint on capture/playback type testing using the actual data. Therefore, testing is performed using sample data such as the data in the DB and the data that is used as a network load test.

BRIEF SUMMARY

Embodiments include a method, system, and computer program product for creating playback data for testing a server. Recorded data that includes transactions executed in a session established between a client and a server at a designated point in time is extracted. A reduction process that includes deleting data related to certain transactions from the extracted recorded data is performed. The certain transactions are part of a specific transaction group which includes transactions that were executed on or before the designated point in time and includes a transaction that was executed without requiring the execution of a predetermined prior transaction. The playback data is output Embodiments additionally include a system for creating playback data for playback of screens for testing a server. The system includes a first identification unit configured to identify a first screen for establishing a session between the client and the server. The system also includes a second identification unit configured to identify a second screen based on at least one of a number of different screens displayed immediately before the second screen, the number of different screens displayed immediately after the second screen, a number of times of displaying the second screen, and a number of screens displayed between displaying the first screen and displaying the second screen. Display of the second screen does not require a transition from a predetermined prior screen. The system further includes a storage unit configured to store recorded data of a screen group with a smallest number of screens among a plurality of screen groups displayed between displaying the first screen and displaying the second screen in a plurality of sessions. The system further includes an extraction unit configured to extract recorded data, the recorded data including a plurality of screens displayed in a particular session established between the client and the server at a designated point of time. The system further includes a creation unit configured to create playback data, the playback data including recorded data of screens displayed between the first screen and the second screen, wherein the screens belonging to the screen group and displayed before the designated point of time are replaced with the recorded data. The system further includes an output unit configured to output the playback data created by the creation unit.

BRIEF DESCRIPTION OF THE SEVERAL VIEWS OF THE DRAWINGS

FIG. 2 is a diagram depicting transactions and the types thereof in an embodiment;

FIGS. 3A and 3B are diagrams depicting how scenarios are changed in an embodiment;

FIGS. 4A and 4B are diagrams depicting an example of how scenarios are changed in an embodiment;

FIG. 10 is a diagram depicting the contents stored in a statistical information storage unit in an embodiment;

DETAILED DESCRIPTION

Figure 1:
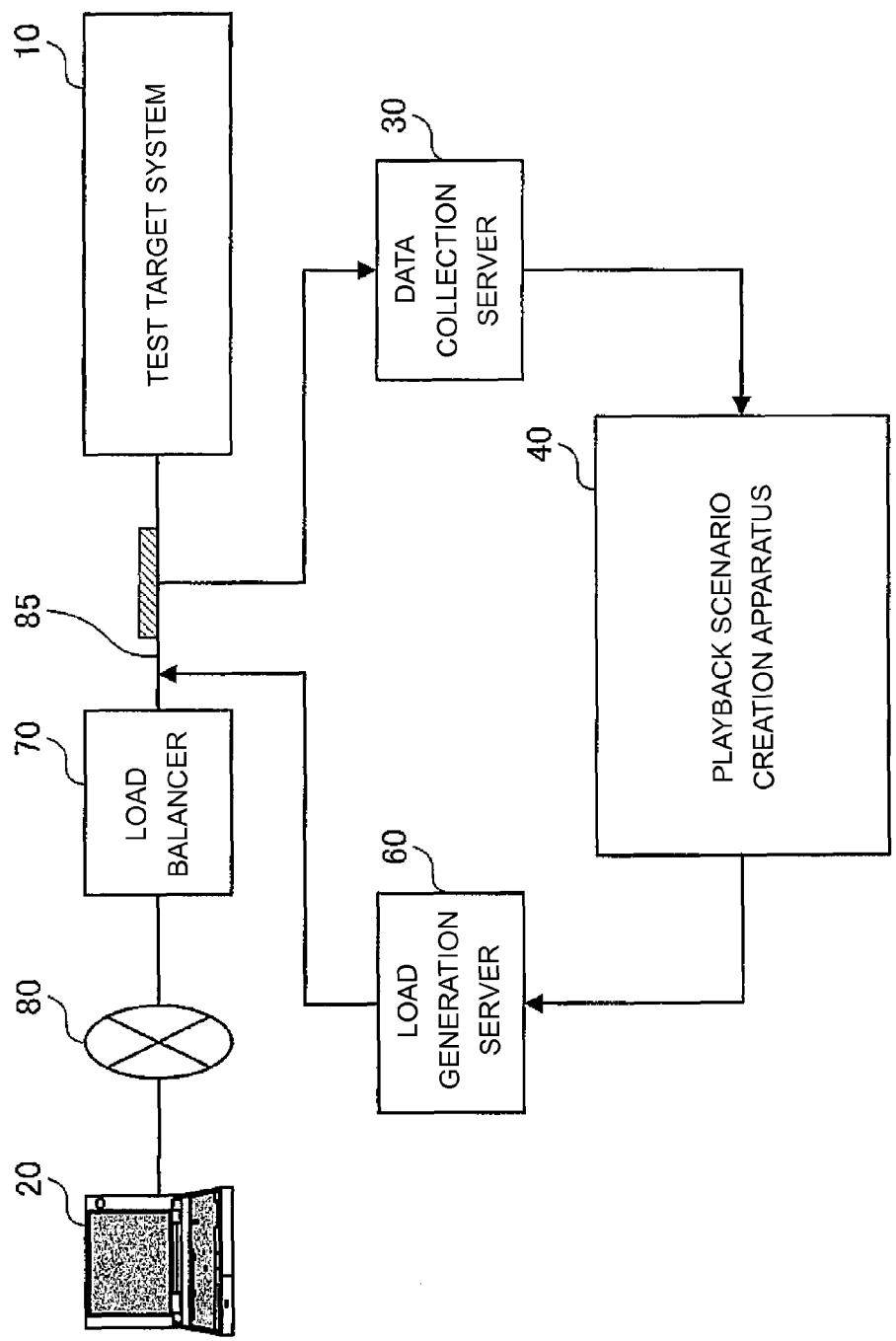
FIG. 1 is a block diagram depicting the configuration of a computer system in an embodiment.

In general, contemporary systems perform load testing of a target system by applying a high transaction load to the target system. When using actual data processed by the target system to create load test data, high transaction load test data may be obtained by playing back the load of the target system at a peak time. The starting point of the load testing, however, currently cannot be set at the peak time of the load, and it is generally set within a time period before the start of a service operation or in a time period having a low load (for example, early in the morning). This is because user sessions are already active at the starting point. For example, if a user session which is active at the starting point is played back from the starting point, the user session may not be played back normally because some necessary procedures (e.g., authentication) may have been omitted. As a result, playback is currently performed on the actual data from the start of the service operation to the peak time, which prolongs the amount of time required for load testing.

In addition, the aforementioned contemporary operation verification test of the backup system using actual data includes the following procedures to be taken. First, a copy operation that is being performed on a database (DB) from the production system to the backup system is interrupted at the assumptive disaster time point while a network trace is captured at the production system. During and after this event, the capture of the network trace is continued. Then, the backup system is started up using the DB copied from the production system. After the backup system becomes operational, the load at and after the assumptive disaster time point, which is based on the network trace captured at the production system, starts to be played back against the backup system, and the playback is continued for a certain period of time.

However, a user session that is already active at the assumptive disaster time point is regarded as invalid because the backup system starts to operate the user session in playback without performing a login operation that should be performed again at the backup system.

To avoid this, the testing may be performed under a constraint such as that the assumptive disaster time point is set within a time period having no or very few logged-in users (for example, at night), or that user sessions of only users who log in at and after the assumptive disaster time point are played back. This however, may produce an insufficient load. In any of these cases, however, the playback test effectiveness will be reduced.

As described above, when testing a server on which a web application, for example, is running, by playing back certain transactions based on actual data, the conventional techniques are not able to prevent the transaction playback from making a session invalid or able shorten the time required for the transaction playback.

In an embodiment described herein, transaction playback is enabled for server testing while preventing the transaction playback from making a session invalid and also shortening the time required for the transaction playback.

In an embodiment, an apparatus that creates playback data for playback of transactions, which will be executed to test a server, based on recorded data of transactions executed on the server in response to requests from clients is provided. The apparatus includes an extraction unit configured to extract recorded data of transactions executed in a particular session established between the client and the server at a designated time point. The apparatus also includes a creation unit configured to create the playback data by performing a reduction process to cut off recorded data of certain transactions from the recorded data extracted by the extraction unit. The certain transactions are those executed between the execution of a first transaction for establishing a session between the client and the server, and the execution of a second transaction belonging to a specific transaction group and being executed at or before the designated time point. The specific transaction group includes a transaction not having a constraint which permits the transaction to be executed only immediately after a predetermined transaction. The apparatus further includes an output unit configured to output the playback data created by the creation unit.

In an embodiment, the apparatus further includes a storage unit configured to store recorded data of a transaction group with the smallest number of transactions among a plurality of transaction groups executed in a plurality of sessions between the execution of the corresponding first transaction and the execution of the corresponding second transaction. The creation unit creates the playback data using a reduction process that replaces the recorded data of the transactions executed between the execution of the first transaction and the execution of the second transaction in the recorded data extracted by the extraction unit, with the recorded data stored in the storage unit.

In an additional embodiment, when a third transaction having the same content as the second transaction is executed in the particular session between the execution of the first transaction and the execution of the second transaction, the creation unit may create the playback data by a reduction process that deletes recorded data of transactions executed between the execution of the third transaction and the execution of the second transaction from the recorded data extracted by the extraction unit.

In a further embodiment, the creation unit creates the playback data by a reduction process that deletes the recorded data of the transactions executed between the execution of the first transaction and the execution of the second transaction from the recorded data extracted by the extraction unit.

In an additional embodiment, the apparatus further includes a storage unit configured to store recorded data of a transaction group with the smallest number of transactions among a plurality of transaction groups executed in a plurality of sessions between the execution of the corresponding first transaction and the execution of the corresponding second transaction. If a third transaction having the same content as the second transaction is executed in the particular session between the execution of the first transaction and the execution of the second transaction, the creation unit creates first playback data by a first reduction process that deletes recorded data of transactions executed between the execution of the third transaction and the execution of the second transaction from the recorded data extracted by the extraction unit. The creation unit further creates second playback data by a second reduction process that replaces, with the recorded data stored in the storage unit, the recorded data of the transactions executed between the execution of the first transaction and the execution of the second transaction in the recorded data extracted by the extraction unit. The output unit outputs information about an effect of the reduction by the first reduction process and an effect of the reduction by the second reduction process.

In an additional embodiment, the apparatus further includes a storage unit configured to accumulate recorded data of transactions executed in more than one session, and a determination unit configured to evaluate a transaction of the particular transaction group on the basis of the recorded data accumulated in the storage unit.

In an embodiment, the determination unit evaluates a transaction of the particular transaction group based on at least one of a number of different transactions executed immediately before the transaction, the number of different transactions executed immediately after the transaction, the number of times the transaction is executed, and the number of transactions executed between the execution of the first transaction and the execution of the transaction, all of which are obtained from the recorded data stored in the storage unit.

A further embodiment includes an apparatus that creates playback data for playback of a screen to test a server based on recorded data from information on screens transmitted by the server in response to requests from a client. The apparatus includes a first identification unit configured to identify a first screen for establishing a session between the client and the server, on the basis of information provided to the apparatus. The apparatus also includes a second identification unit configured to identify a screen of a specific screen group including a screen not having a constraint that permits a transition to the screen to be made only from a predetermined screen, on the basis of at least one of the number of different screens displayed immediately before the screen, the number of different screens displayed immediately after the screen, the number of times the screen is displayed, the number of screens displayed between the display of the first screen and the display of the screen, and information provided from outside. The apparatus also includes an extraction unit that is configured to extract recorded data from screens displayed in a particular session established between the client and the server at a designated time point. A creation unit is configured to create playback data in such a way that, if a second screen belonging to the specific screen group is displayed twice in the particular session between the display of the first screen and the designated time point, recorded data from a screen displayed between the first display of the second screen and the second display of the second screen is deleted from the recorded data extracted by the extraction unit. The apparatus further includes an output unit that is configured to output the playback data created by the creation unit.

An additional embodiment includes an apparatus that creates playback data for playback of a screen to test a server on the basis of recorded data of information on screens transmitted by the server in response to requests from a client. The apparatus includes a first identification unit configured to identify a first screen for establishing a session between the client and the server, on the basis of information provided from outside. A second identification unit is configured to identify a screen of a specific screen group including a screen not having a constraint which permits a transition to the screen to be made only from a predetermined screen, on the basis of at least one of the number of different screens displayed immediately before the screen, the number of different screens displayed immediately after the screen, the number of times of displaying the screen, the number of screens displayed between the display of the first screen and the display of the screen, and information provided from outside. A storage unit is configured to store, in association with each screen displayed in a plurality of sessions, recorded data of a screen group with the smallest number of screens among a plurality of screen groups displayed between the display of the first screen and the display of the screen in the plurality of sessions. An extraction unit is configured to extract recorded data of information of screens displayed in a particular session established between the client and the server at a designated time point. A creation unit is configured to create playback data using the recorded data extracted by the extraction unit, recorded data of information of screens displayed between the display of the first screen and the display of a second screen belonging to the specific screen group and displayed before the designated time point is replaced with the recorded data stored in association with the second screen in the storage unit; and an output unit configured to output the playback data created by the creation unit.

An embodiment includes a method for creating playback data for the playback of transactions that are to be executed to test a server, using data recorded from transactions executed on the server in response to requests from a client. The method includes extracting recorded data from transactions executed in a particular session established between the client and the server at a designated time point. Playback data is created by performing a reduction process in order to remove recorded data of certain transactions from the recorded data extracted by the extraction unit. The certain transactions are executed between the execution of a first transaction for establishing a session between the client and the server, and the execution of a second transaction belonging to a specific transaction group and being executed at or before the designated time point. The specific transaction group includes a transaction without a constraint that requires the transaction to be executed only immediately after a predetermined transaction. The playback data is output.

A further embodiment includes a program causing a computer to function as an apparatus that creates playback data for playback of transactions that are to be executed to test a server based on data recorded from transactions executed on the server in response to requests from a client, the program causing the computer to function as an extraction unit configured to extract recorded data of transactions executed in a particular session established between the client and the server at a designated time point. A creation unit is configured to create the playback data by performing a reduction process to cut off recorded data of certain transactions from the recorded data extracted by the extraction unit, the certain transactions executed between the execution of a first transaction for establishing a session between the client and the server, and the execution of a second transaction belonging to a specific transaction group and being executed at or before the designated time point. The specific transaction group includes a transaction does not require the transaction to be executed only immediately after a predetermined transaction. An output unit is configured to output the playback data created by the creation unit.

Technical effects and benefits of embodiments described herein include the ability to prevent the execution of invalid transactions while playing back transactions for testing a server. In addition, the time to complete the transaction playback is shortened.

In the hypertext transfer protocol (HTTP), which is a protocol used in web applications, an HTTP request is sent from a client to a server while an HTTP response is returned from the server to the client. In capture/playback type load testing, a request and its expected response are extracted from this series of communications to create a playback script, and a load is played back based on one or more of these request and response combinations. This load playback is performed for multiple users simultaneously based on the load that is necessary to perform a valid load test.

The start point of a load test cannot be utilized in an operation verification test of a backup system because not all conditions required for verification tests have been met. Specifically, when utilizing a web application, a user first performs authentication to establish a user session and then performs the user performs operations in the established user session. At the start point of the test (e.g., the assumptive disaster time point), a number of users have already established their user sessions. Thus, applying loads by playing back actual data at the start point of the test results in loading an application without the establishment of the user sessions. For this reason, when the load is played back, the loads are rejected as invalid requests at the web application side because they don't have valid sessions, and therefore fail to serve as valid loads on the system.

Moreover, even if a session has been established, certain requests to web applications are not always executable without having previously executed the immediately previous screen. These include requests that are determined as invalid if screen transitions made up of a series of requests and responses are not performed in an appropriate sequence. There are web application designs which allow no interruption between screens by requiring certain screen transitions from the start to the end of one service.

Thus, in this embodiment, playback scripts created from actual data are changed such that the requests/responses between the establishment of user sessions and the start point of the test are deleted from the playback targets, but the portions with a constraint on screen transition sequence are left as they are.

Embodiments of the present invention will be described in detail with reference to the accompanying drawings.

FIG. 1 is a block diagram showing an example of the configuration of a computer system in an embodiment. As shown in FIG. 1, a test target system 10 is in communication with a client 20 through a load balancer 70 serving as a load distribution apparatus, a network 80 such as the Internet, and a network 85 such as a local area network (LAN). Moreover, a data collection server 30 is in communication with a mirror port or test access port (TAP) of a shaded switch on the network 85, and a playback scenario creation apparatus 40 is in communication with the data collection server 30. Further, the playback scenario creation apparatus 40 is connected to a load generation server 60, and the load generation server 60 is connected to the network 85.

In an embodiment, the test target system 10 is a system for providing a service in accordance with a request from a browser installed in the client 20. In this embodiment, the test target system 10 is a system serving as test target for a test that is based on network traffic generated by the load generation server 60. More specifically, the test target system 10 includes an HTTP server (not shown), web application server (not shown), DB server (not shown), etc. Moreover, the test target system 10 also includes a disk system (not shown) which copies a production DB (actual DB) to a DB (test DB) to be used in the testing. In order to perform the testing, the test target system 10 copies a snapshot of the actual DB to the test DB. Then, before playing back the network traffic, the test target system 10 switches its DB connection to the test DB which includes data that represents the point in time at which the snapshot is captured. The DB connection is set back to its original state after the testing is finished. Note that although FIG. 1 shows only one test target system 10, the number of test target systems 10 may be two or more. In an embodiment that includes multiple test target systems 10, the load balancer 70 distributes loads across the test target systems 10.

The client 20 is a computer apparatus which is used by the user uses to access a service provided by the test target system 10. In an embodiment, the client 20 is a personal computer (PC). Note that although FIG. 1 depicts only a single client 20, the number of clients 20 may be two or more. In an embodiment that includes multiple clients 20, the term "client" refers to one of the client's 20.

The data collection server 30 is a server computer which continuously captures all the network traffic from the network 85 and in the event that a failure occurs, the data collection server 30 is used for problem determination. The data collection server 30 uses information at and below the transmission control protocol (TCP) layer to sort the network traffic based on the source or target client 20. In an embodiment, the data collection server 30 is a PC, a workstation, or some other computer. Note that although FIG. 1 shows only one data collection server 30, the number of data collection servers 30 is not limited, and multiple data collection servers 30 may be used based on required capacity. In embodiments that include multiple data collection servers 30, a data collection management server (not shown) may be used to control the multiple data collection servers 30.

The playback scenario creation apparatus 40 continuously reads the sorted network traffic from the data collection server 30 and extracts information necessary for load playback. The playback scenario creation apparatus 40 also performs statistical analysis for screen transitions and stores the resulting statistical information. The statistical information is updated as new network traffic is processed. In an embodiment, when given a start point (or an assumptive disaster time point), the playback scenario creation apparatus 40 creates a session recovery scenario for each user session (hereinafter, simply referred to as "session") to match the session that was active at the actual start point. In the session recovery scenario, the whole session is recovered from the playback scenario both before and after the start point. Moreover, the playback scenario creation apparatus 40 sends the session recovery scenario and each playback scenario started at or after the start point to the load generation server 60 to be used as playback scenarios. In an embodiment, the playback scenario creation apparatus 40 is a PC, a workstation, or some other computer. In an embodiment, the term "scenario" refers to information which is necessary for the load generation server 60 to generate a load, and also contains the transaction execution sequence of executed transactions or the sequence of the display of screens in a session, etc.

In an embodiment, the load generation server 60 plays back HTTP requests based on the playback scenarios created by the playback scenario creation apparatus 40, sends the HTTP requests to the test target system 10, and receives corresponding HTTP responses from the test target system 10. The load generation server 60 also monitors the contents of the HTTP responses. In an embodiment, the load generation server 60 is a PC, a workstation, or some other computer. Note that although FIG. 1 shows only one load generation server 60, the number of load generation servers 60 is not limited, and multiple load generation servers 60 may be provided based on the required capacity. In embodiments with multiple load generation servers 60, a load generation management server (not shown) may be implemented to control the multiple load generation servers 60.

In an embodiment, the following conditions need to be met in order to enable scenario playback: the HTTP traffic is not encrypted at a mirror port or TAP where packets are captured, the HTTP traffic may, however, be encrypted between the client 20 and the load balancer 70 for example; and the operation of the web application should not be dependent on the scenario playback rate at the client 20.

In an embodiment of the computer system as described above, the playback scenario creation apparatus 40 performs a process described further below.

For the playback scenario of each session, each request/response between the establishment of a session by a user and the start point of the playback scenario is deleted from the playback target. Each request/response with a constraint on screen transition is not deleted even if it lies before the start point of the playback scenario. Thus, the scenario is shortened from the establishment of the session up to a request/response with no constraint on screen transition. As a result, a playback scenario is created that will be valid for the test target system 10.

An outline of a method of creating the playback scenario is described below.

In an embodiment, transactions include a pair of HTTP protocol screen requests and responses (request/response) which are categorized into one of the following four types prior to the creation of the playback scenario: sequence insensitive (SI), sequence sensitive (SS), login/logout sequence (LS), and orphan (OR).

SI transactions are transactions that may be requested from any screen after a session has been established. One example of an SI transaction is a transaction that is associated with a menu screen. Note that the wording "which can be requested from any screen" does not mean to exclude all the states that are incapable of being requested from a certain screen. That is, a set of menu transactions is one example of a particular transaction group that does not have a constraint that requires a transaction to be executed only immediately after a different predetermined transaction. In an embodiment, screens displayed based on transactions of this type are referred to as "SI screens."

SS transactions include transactions that are considered invalid if they are not requested from a particular screen. This is required in order to ensure that the sequence of screen transitions is maintained. One example is a transaction associated with a series of input screens in a service. In an embodiment, screens displayed based on transactions of this type are referred to as "SS screens."

LS transactions include transactions that are used to establish or release a user session. In an embodiment, screens displayed based on transactions of this type are referred to as "LS screens."

OR transactions are transactions that may be requested from any screen, but must return to the original screen upon a request from an SS screen in order to continue the process. Transactions of this type are similar to SI transactions because they can be requested from any screen, yet are treated differently from SI transactions. One example of an OR transaction is a transaction requesting a help screen. In an embodiment, screens displayed based on transactions of this type are referred to as "OR screens."

FIG. 2 depicts transactions recorded in a network trace, and the types of the transactions in an embodiment. In FIG. 2, each black triangle represents a request while each black inverted triangle represents a response. In addition, each transaction is shown with at least one set of request/response. Note that the transactions listed by their screen names are transactions that are used to display the screens corresponding to those screen names. Moreover, each transaction is shown with one of the four transaction types described above based on how the transaction is categorized.

FIGS. 3A and 3B depict how scenarios are changed in an embodiment. In an embodiment, the scenario change occurs when the playback start point is set to period of time with a high load (e.g. 13:00). In FIGS. 3A and 3B, one square represents a transaction (request and response) associated with one screen. Note also that requests for embedded files (such as cascading style sheets (CSS) and graphics interchange format (GIF)) are omitted. Moreover, "authentication" represents a transaction for authentication (i.e., an authentication sequence), while "SIx" represents a transaction associated with a screen that does not have a constraint on screen transitions.

FIG. 3A depicts the scenarios before they have been changed (i.e., original scenarios), while FIG. 3B depicts the scenarios after they have been changed (i.e., playback scenarios). The scenarios of sessions C1, C2, and C4 are already active at the start point and each of them are changed such that the screen transitions performed between the authentication sequence and the first SI screen prior to the start point are deleted. Consequently, as shown by the arrows at the bottom of FIG. 3B, heading portions of some original scenarios are shortened, scenarios for performing the authentication and load ramp up are set immediately before the start point, and scenarios can be played back in a high load state after the start point.

FIGS. 4A and 4B depict how scenarios are changed in an embodiment. In an embodiment FIGS. 4A and 4B depict scenarios that are changed based on a desired assumptive disaster time point that is set in order to test switching from a production to a backup system that is used as a disaster recovery system. Note that in FIGS. 4A and 4B, one square represents a transaction (request and response) associated with one screen. Note also that requests for embedded files (such as CSS and GIF) are omitted. Moreover, "authentication" represents a transaction for authentication (authentication sequence), while "SIx" represents a transaction associated with a screen that does not have a constraint on screen transitions.

FIG. 4A depicts the scenarios before the change (i.e., original scenarios), while FIG. 4B shows the scenarios after the change (i.e., playback scenarios). The scenarios of sessions C1, C2, and C4 are already active at the assumptive disaster time point and therefore each of the scenarios is changed such that screen transitions performed between the authentication sequence and the first SI screen that occur prior to the assumptive disaster are deleted. Moreover, in these sessions, no processes are performed at or before the assumptive disaster time point. Instead, as shown by the arrow at the bottom of FIG. 4B, a scenario where the users log in and resume their processes is simulated after the assumptive disaster time point.

Figure 5:
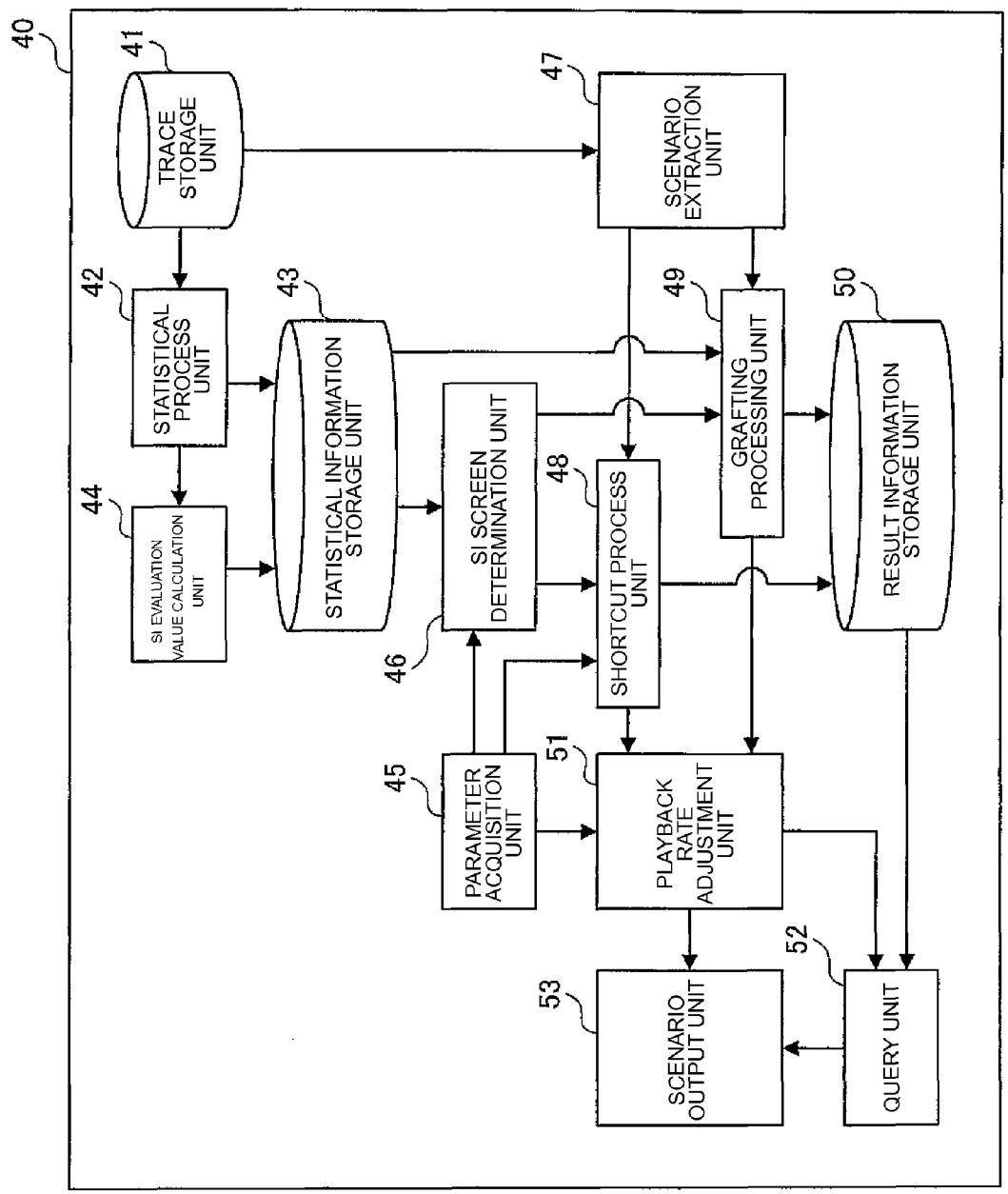
FIG. 5 is a block diagram depicting the functional configuration of a playback scenario creation apparatus in an embodiment.

FIG. 5 depicts a block diagram of the functional configuration of the playback scenario creation apparatus 40 in an embodiment.

As shown in FIG. 5, the playback scenario creation apparatus 40 includes a trace storage unit 41, a statistical process unit 42, a statistical information storage unit 43, an SI evaluation value calculation unit 44, a parameter acquisition unit 45, and an SI screen determination unit 46. Moreover, the playback scenario creation apparatus 40 includes a scenario extraction unit 47, a shortcut process unit 48, a grafting process unit 49, a result information storage unit 50, a playback rate adjustment unit 51, a query unit 52, and a scenario output unit 53.

In an embodiment, the trace storage unit 41 stores the network traces (hereinafter, simply referred to as "traces") on the network 85 of FIG. 1. In an embodiment, the traces are used as a source of recorded data from which a number of transactions are recorded, and the trace storage unit 41 is an accumulation unit for accumulating the recorded data.

In an embodiment, the statistical process unit 42 performs a statistical process on traces (the results of which are stored as processing targets) and outputs statistical information in the trace storage unit 41. The statistical process unit 42 outputs the number of transition source screens, the number of transition destination screens, the number of appearances, and screen transition information (e.g., the smallest number of transition screens, the shortest screen transitions, and the inequality flag), the details of which will be described below. In addition, the statistical process unit 42 performs a process to identify LS screens (e.g., an authentication screen) and OR screens as a part of pre-processing the traces. In an embodiment, an authentication screen is used as a first screen for a client to establish a session with a server, and the statistical process unit 42 is provided as a first identification unit for identifying the first screen.

In an embodiment, the statistical information storage unit 43 stores the statistical information that has been output by the statistical process unit 42. Specifically, the statistical information storage unit 43 stores the number of transition source screens, the number of transition destination screens, the number of appearances, and the screen transition information (i.e., the smallest number of transition screens, the shortest screen transitions, and the inequality flag), details of which will be described below. In an embodiment, the shortest screen transitions are used as recorded data in which a transaction group with the smallest number of transactions is recorded, and the statistical information storage unit 43 is a storage unit for storing such recorded data.

The SI evaluation value calculation unit 44 applies a predefined evaluation function that is designed to determine SI screens based on the statistical information stored in the statistical information storage unit 43. This used to calculate an evaluation value for the SI screen value determination (hereinafter, referred to as "SI evaluation value") for each screen, and to associate the SI evaluation value thereto.

The parameter acquisition unit 45 acquires parameters that have been input by the user into the playback scenario creation apparatus 40. In an embodiment, the parameters include a SI judgment criterion, a shortening result judgment criterion, and a playback rate adjustment criterion, details of which will be described below.

The SI screen determination unit 46 compares the SI evaluation value of each screen that was calculated by the SI evaluation value calculation unit 44 with the SI judgment criterion included in the parameters acquired by the parameter acquisition unit 45 in order to determine which screens are SI screens. In an embodiment, the SI screen determination unit 46 is a determination unit for determining a transaction of the particular transaction group, or an identification unit for identifying a screen of the particular screen group.

The scenario extraction unit 47 extracts a scenario for each session based on the corresponding sorted network traffic that is output by the data collection server 30. In an embodiment, the scenario is used as recorded data which includes transactions executed in a particular session, or information on screens displayed in a particular session. The scenario extraction unit 47 is an extraction unit for extracting the recorded data.

The shortcut process unit 48 performs a shortening process using a shortcut (hereinafter, simply referred to as "shortcut shortening process") on the scenarios extracted by the scenario extraction unit 47 and outputs the shortened scenarios. The shortcut shortening process is described below. In an embodiment, a shortening process is performed as a reduction process that reduces recorded data, and the shortcut shortening process is performed as a reduction process that deletes recorded data or as a first reduction process. Moreover, the shortened scenarios are used as playback data for playing back transactions or as playback data for playing back screens. Further, the shortcut process unit 48 is a creation unit for creating the playback data or as a creation unit for creating first playback data.

The grafting process unit 49 performs a shortening process using grafting (hereinafter, simply referred to as "grafting shortening process") on scenarios extracted by the scenario extraction unit 47 and outputs the shortened scenarios. Note that the grafting shortening process is described below. In an embodiment, the grafting shortening process is performed as the reduction process that replaces the recorded data, or as a second reduction process. Moreover, the grafting process unit 49 is a creation unit for creating the playback data, or as a creation unit for creating second playback data.

The result information storage unit 50 stores result information about the results of the shortening of the scenarios by the shortcut process unit 48, and result information about the results of the shortening of the scenarios by the grafting process unit 49.

The playback rate adjustment unit 51 adjusts the start times and playback rates of the transactions included in the scenarios shortened by the shortcut process unit 48 or the grafting process unit 49.

The query unit 52 outputs the result information stored in the result information storage unit 50 to a display mechanism 90d (see FIG. 15) and acquires information that is input by its user. In an embodiment, the query unit 52 is an output means for outputting information about the result of the reduction.

The scenario output unit 53 outputs the shortened scenarios outputted by the shortcut process unit 48 or the grafting process unit 49 to the load generation server 60. In an embodiment, the scenario output unit 53 an output unit for outputting the playback data.

Operations of the playback scenario creation unit 40 are described below. Note that, in an embodiment, the traces acquired from the data collection server 30 are stored in the trace storage unit 41 prior to the operations.

Figure 6:
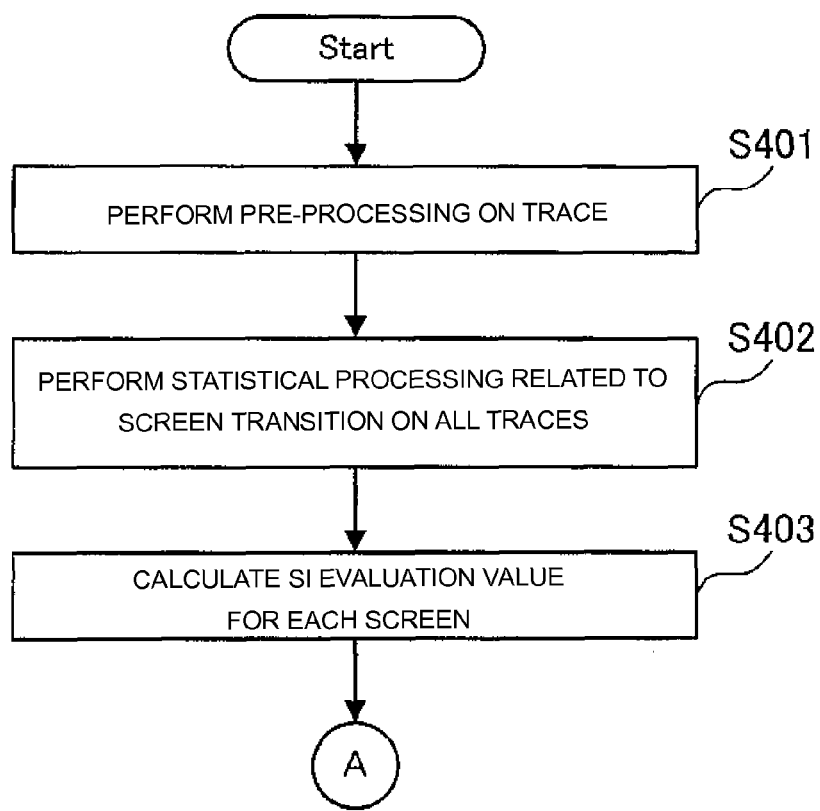
FIG. 6 is a flowchart depicting an example of an operation of the playback scenario creation apparatus in an embodiment.

FIG. 6 is a flowchart depicting an example of the operation performed when the playback scenario creation apparatus 40 performs a statistical process using the traces in an embodiment.

In an embodiment of the playback scenario creation apparatus 40, at block S401, the statistical process unit 42 performs pre-processing on traces stored in the trace storage unit 41. In the pre-processing, transactions such as, for example, LS and OR transactions are identified. LS and OR transactions are assumed to be given in advance as system-specific information. This information that has been given in advance is obtained from the system's basic design information. Alternatively, the information may be read from the trace information.

At block S402, the statistical process unit 42 performs a statistical process related to screen transition by using all the traces stored in the trace storage unit 41. In an embodiment, the statistical process unit 42 analyzes the screen transitions and also finds, for each screen, the screen transitions using the smallest number of transition screens from the login (i.e., the shortest screen transitions).

At block S403, the SI evaluation value calculation unit 44 calculates the SI evaluation value for each screen and stores the SI evaluation value in the statistical information storage unit 43 in association with the corresponding screen.

In an embodiment, the processing by the statistical process unit 42 and the SI evaluation value calculation unit 44 are executed prior to the scenario shortening process.

The playback scenario creation apparatus 40 performs a scenario shortening process.

Figure 7:
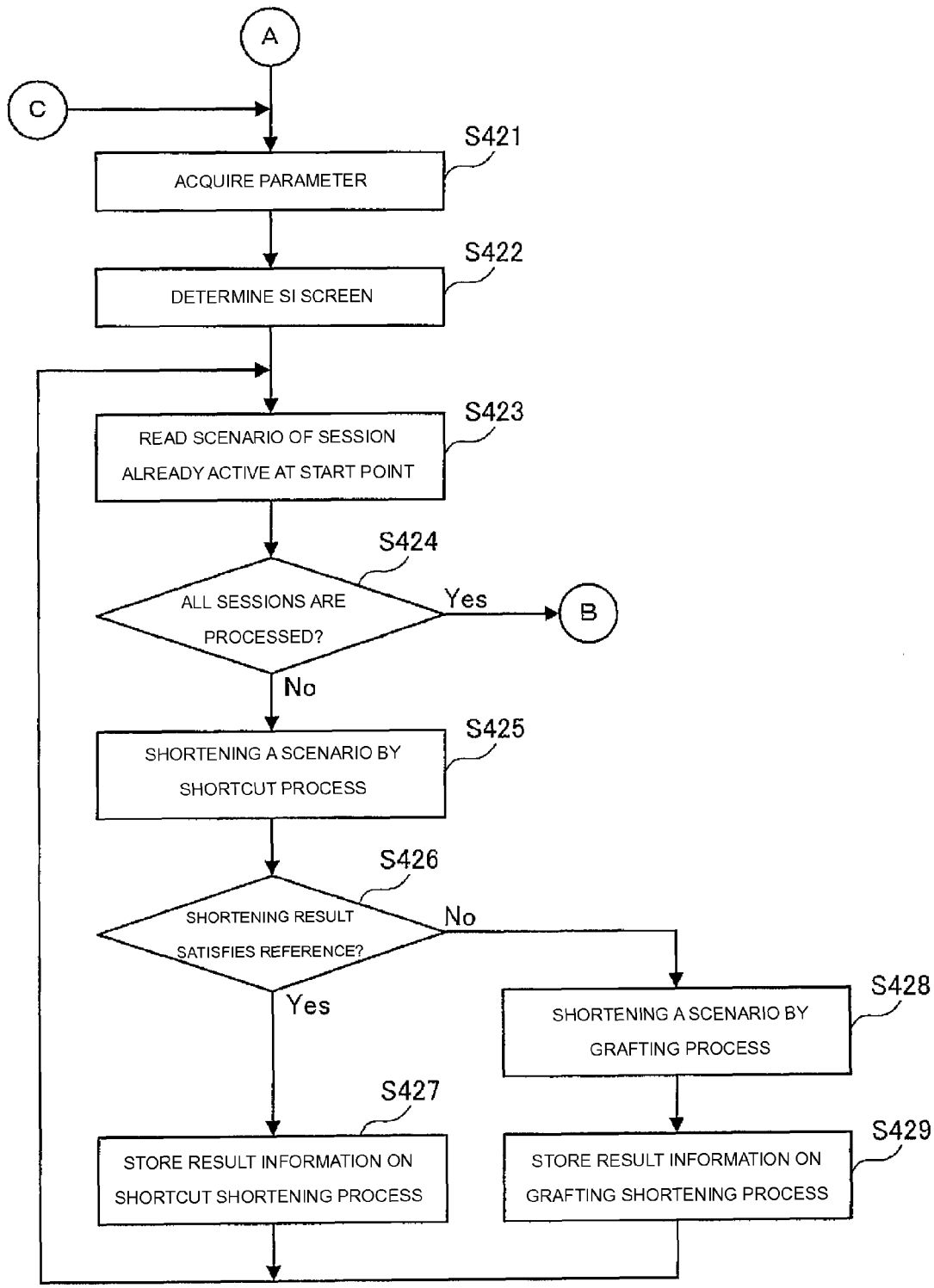
FIG. 7 is a flowchart depicting an operation of the playback scenario creation apparatus in an embodiment.

FIG. 7 depicts a flowchart of the operation performed when the playback scenario creation apparatus 40 performs the scenario shortening process in an embodiment.

At block S421, as each user inputs parameters, the parameter acquisition unit 45 acquires the input parameters. In an embodiment, the input parameters include the aforementioned SI judgment criterion, the shortening result judgment criterion, and the playback rate adjustment criterion, and the parameter acquisition unit 45 acquires each of these criteria.

At block S422, the SI screen determination unit 46 determines SI screens by comparing the SI evaluation values calculated at block S403 with the SI judgment criterion of the parameters acquired at block S421. The playback scenario creation apparatus 40 automatically determines SI screens as described, however, if there are screens that have already been identified as SI screens, information indicating that at least those screens are SI screens may be provided in advance.

At block S423, the scenario extraction unit 47 reads the scenario of a session that has already been active at the start point from the traces stored in the trace storage unit 41, and at block S424 determines whether or not the scenarios of all the sessions have been processed.

At block S425, which is performed when it is determined that the scenarios of all the sessions are not yet processed, the shortcut process unit 48 performs its shortcut shortening process on the scenario read at block S423. In an embodiment, the shortcut process unit 48 searches the scenario backward starting from the start point for an SI screen. If it finds an SI screen, the shortcut process unit 48 searches the scenario forward from the login for the same SI screen. If it finds the same SI screen, the shortcut process unit 48 cuts the screens between these same SI screens.

At block S426, the shortcut process unit 48 determines whether or not the result of the shortening performed at block S425 satisfies the shortening result judgment criterion of the parameters acquired at block S421.

At block S427, if the determination result shows that the shortening result satisfies the shortening result judgment criterion, the shortcut process unit 48 stores the result information of the shortcut shortening process in the result information storage unit 50. In an embodiment, the result information includes the number of sessions subjected to the shortcut shortening process, and the largest value, the smallest value, and the average value of the results of the shortcut shortening process, for example. The process returns to block S423 to process the next session.

At block S428, if the shortening result is determined to not satisfy the shortening result judgment criterion, the grafting process unit 49 performs its grafting shortening process on the scenario read at block S423. In an embodiment, the grafting process unit 49 searches the scenario backward from the start point for an SI screen and connects, before the SI screen, the corresponding shortest screen transitions stored in the statistical information storage unit 43. At block S429, the grafting process unit 49 stores result information of the result of the grafting shortening process in the result information storage unit 50. The result information includes the number of sessions subjected to the grafting shortening process, and the largest value, the smallest value, and the average value of the results of the grafting shortening process, for example. The process returns to block S423 to process the next session.

In an embodiment, in the scenario shortening process, sessions that have already been active at the start point are extracted, and the shortened process(es) is/are performed on each of these sessions. A method is employed in which transactions in each session are set as SS by default, and transactions that are determined to be LS, OR, or SI are searched for from those transactions. Thus, if an SI transaction is not determined to be an SI transaction, this transaction is treated as an SS transaction, and the screen transitions before and after the transaction will not be changed. Accordingly, an invalid playback scenario is avoided.

Assuming that all the sessions are processed in the manner described above and that the scenarios of all the sessions have been processed at block S424, then the playback scenario creation apparatus 40 performs post-processing.

Figure 8:
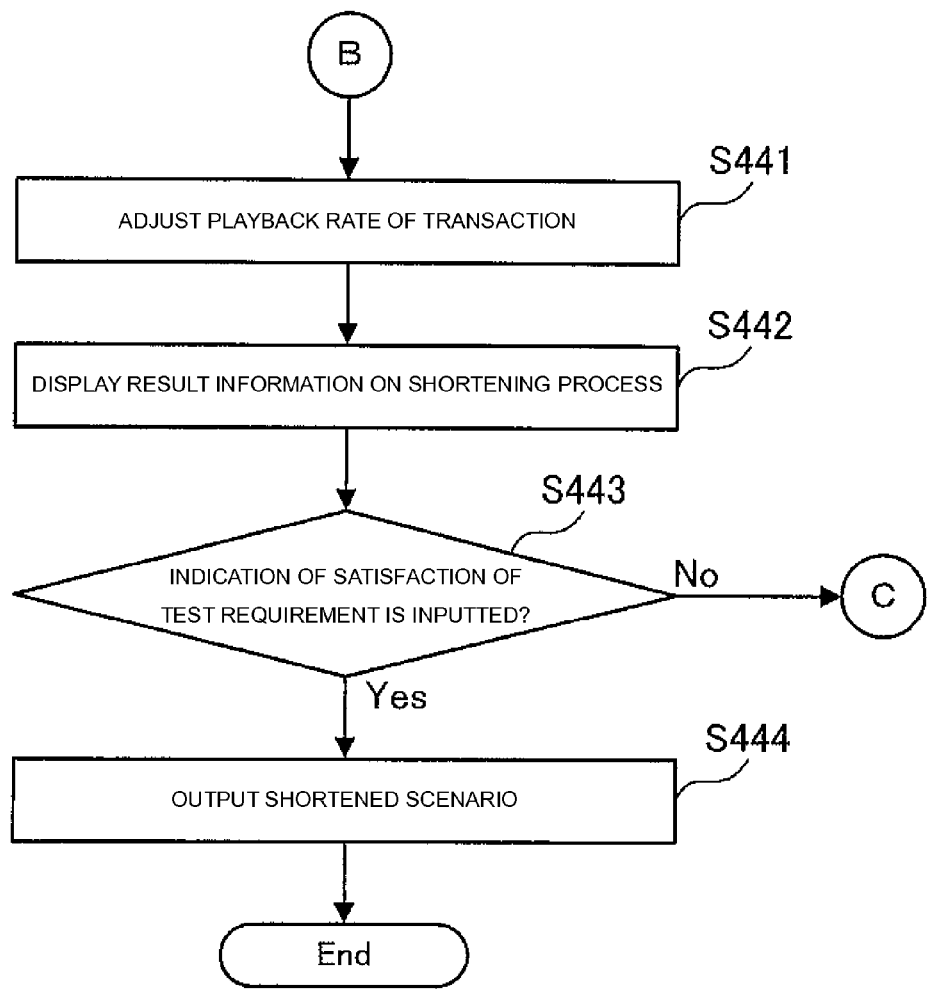
FIG. 8 is a flowchart depicting an operation of the playback scenario creation apparatus in an embodiment.

FIG. 8 is a flowchart showing an example of the operation performed when the playback scenario creation apparatus 40 performs the post-processing in an embodiment.

At block S441, the playback rate adjustment unit 51 of the playback scenario creation apparatus 40, adjusts the playback rate of each scenario shortened at block S425 or S428. In an embodiment, the playback rate adjustment unit 51 adjusts the start time of the scenario as well.

Figure 15:
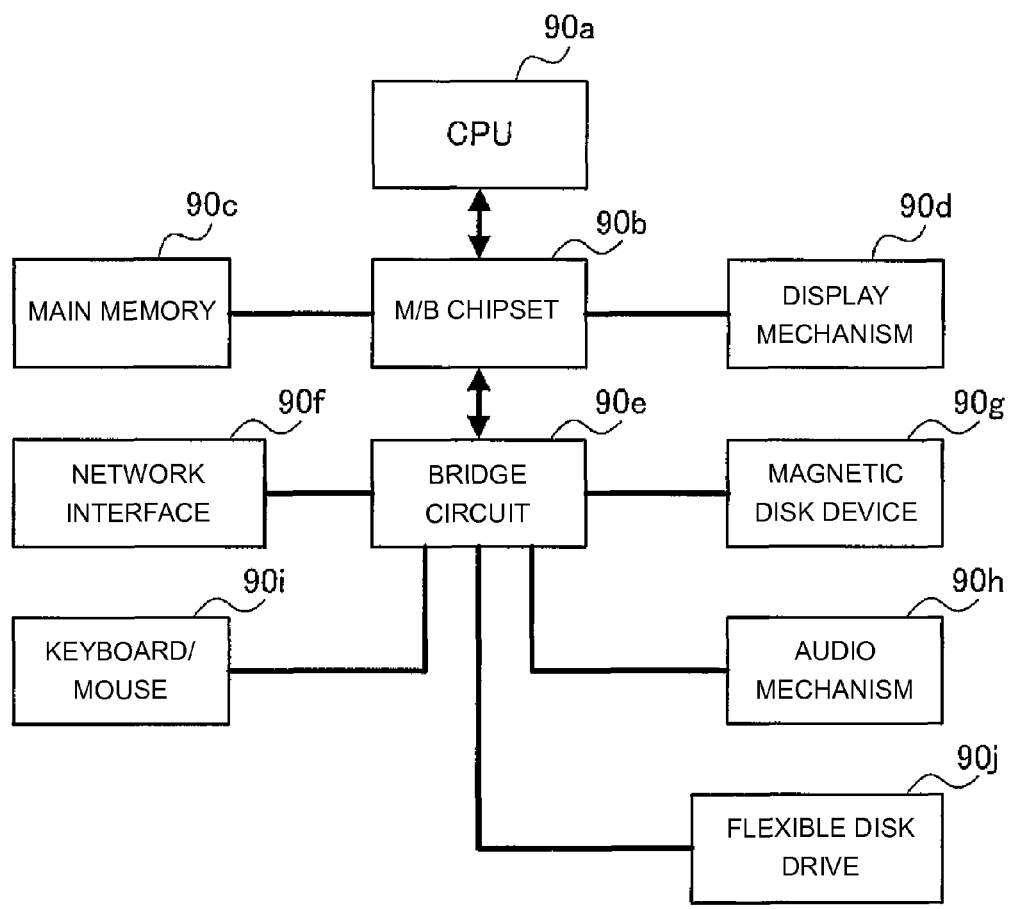
FIG. 15 is a diagram depicting the hardware configuration of a computer in an embodiment.

At block S442, the query unit 52 outputs the result information stored in the result information storage unit 50 and the playback rate is adjusted by the playback rate adjustment unit 51 to the display mechanism 90d of FIG. 15. In an embodiment, the result information and the playback rate are displayed on the display mechanism 90d.

In response to this, the user inputs information indicating whether or not the test requirement is satisfied. At block S443, upon receipt of this information, the query unit 52 determines whether or not the information indicates that the test requirement is satisfied. At block S444, if the information indicates that the test requirement is satisfied, the scenario output unit 53 outputs the corresponding shortened scenario to the load generation server 60.

Embodiments of processes performed by blocks in FIGS. 6, 7 and 8 are described in further detail below.

Block S401 of FIG. 6.

In this block, the statistical process unit 42 performs pre-processing on a number of traces of the test target system 10. In an embodiment the pre-processing is performed on an amount of traces beyond which increasing the number of traces provides no new screen transitions with a smaller number of screens based on the analysis of block S402 and causes the SI evaluation values calculated in block S403 to converge and show no changes.

In an embodiment, pre-processing includes identifying authentication screens (LS), orphan (OR) screens, etc. and in putting them into the playback scenario creation apparatus 40 so that the authentication screen may be determined for each session, and the OR screens may be hidden to be ignored in subsequent processes. In an embodiment, during the processing used to hide the OR screens, each OR screen is set as a screen accompanying its previous screen, for example. Moreover, in the pre-processing, requests/responses of image files and style sheets embedded in screens are hidden so that HTTP requests and HTML responses for HTML files constituting the screens may be the only processing targets.

Figures 9A, 9B:
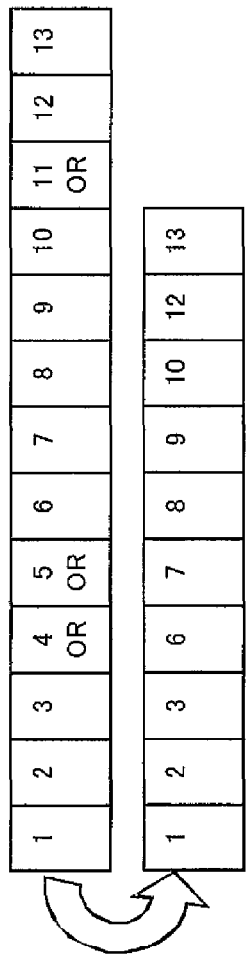
FIG. 9A depicts how orphan (OR) screens are hidden in an embodiment.
FIG. 9B depicts scenarios after OR screens are hidden in an embodiment.

FIG. 9A is a diagram depicting how OR screens are hidden in an embodiment.

In FIG. 9A, screens 4, 5, and 11 are OR screens. The upper sequence of screens shows the scenario of a session before the OR screens have been hidden. The requests/responses for the OR screens are also processing targets. In the lower sequence of screens, OR screens 4 and 5 are hidden between screens 3 and 6, and OR screen 11 is hidden between the screens 10 and 12, so that the requests/responses associated with the OR screens are no longer processing targets.

FIG. 9B depicts a set of scenarios after OR screens in the sessions of users A to E are hidden in an embodiment. While FIG. 9A shows each screen by number, FIG. 9B shows each screen by uniform resource locator (URL) except for an authentication screen.

Block S402 of FIG. 6.

In this block, the statistical process unit 42 analyzes the screen transitions by using the traces and stores the results of the analysis as statistical information in the statistical information storage unit 43. The statistical information is available to be used for subsequent processing.

FIG. 10 depicts the statistical information stored in the statistical information storage unit 43 in an embodiment. FIG. 10 depicts an example of the statistical information that can be obtained from the illustrative scenarios shown in FIG. 9B.

As shown in FIG. 10, the statistical information includes, for each screen, the number of transition source screens, the number of transition destination screens, the number of appearances, and the screen transition information. The number of transition source screens represents the number of screens from which transitions are made to the screen. The number of transition destination screens represents the number of screens to which transitions are made from the screen. The number of appearances represents the number of times the screen appears. Moreover, the screen transition information is a set of information on screen transitions using the shortest route to the screen from its corresponding authentication screen, and includes the smallest number of transition screens, the shortest screen transitions, and an inequality flag. The smallest number of transition screens represents the number of screens across which transitions are made in the shortest route. The shortest screen transitions represent the actual screen transitions in the shortest route. The inequality flag shows that the shortest screen transitions include a screen transition with inconsistent post data.

The statistical process unit 42 finds the number of transition source screens and the number of transition destination screens as follows. Upon each acquisition of a screen from a trace, the statistical process unit 42 finds the screen that led to the acquired screen. If the HTTP header of the HTTP request for the screen includes a referrer, the statistical process unit 42 determines the previous screen on the basis of the referrer. If the HTTP header of the HTTP request for the screen does not include a referrer, the statistical process unit 42 finds the previous screen by retracing the trace. Then, the statistical process unit 42 accumulates the previous screen information of all the screens to find the number of transition source screens and the number of transition destination screens.

In addition, the statistical process unit 42 finds the number of appearances of a screen as follows. For each extract of a screen from a trace, the statistical process unit 42 increments a counter provided for the screen to find the number of appearances thereof.

In an embodiment, the statistical process unit 42 finds the smallest number of transition screens, the shortest screen transitions, and the inequality flag as follows. For each extract of a screen from a trace, the statistical process unit 42 records the number of screens visited before reaching the extracted screen (the number of transition screens) from its corresponding authentication screen, as well as the screen transitions and post data used along the route. If the number of transition screens is smaller than the any other previous number of transition screens, the statistical process unit 42 stores the number of transition screens in the statistical information storage unit 43 as the smallest number of transition screens and also stores the screen transitions in the statistical information storage unit 43 as the shortest screen transition. Meanwhile, the statistical process unit 42 increments the inequality flag stored in the statistical information storage unit 43 if the number of transition screens is the same as the previously recorded smallest number of transition screens but the post data included in the transition screens differs from previous post data.

Figure 11:
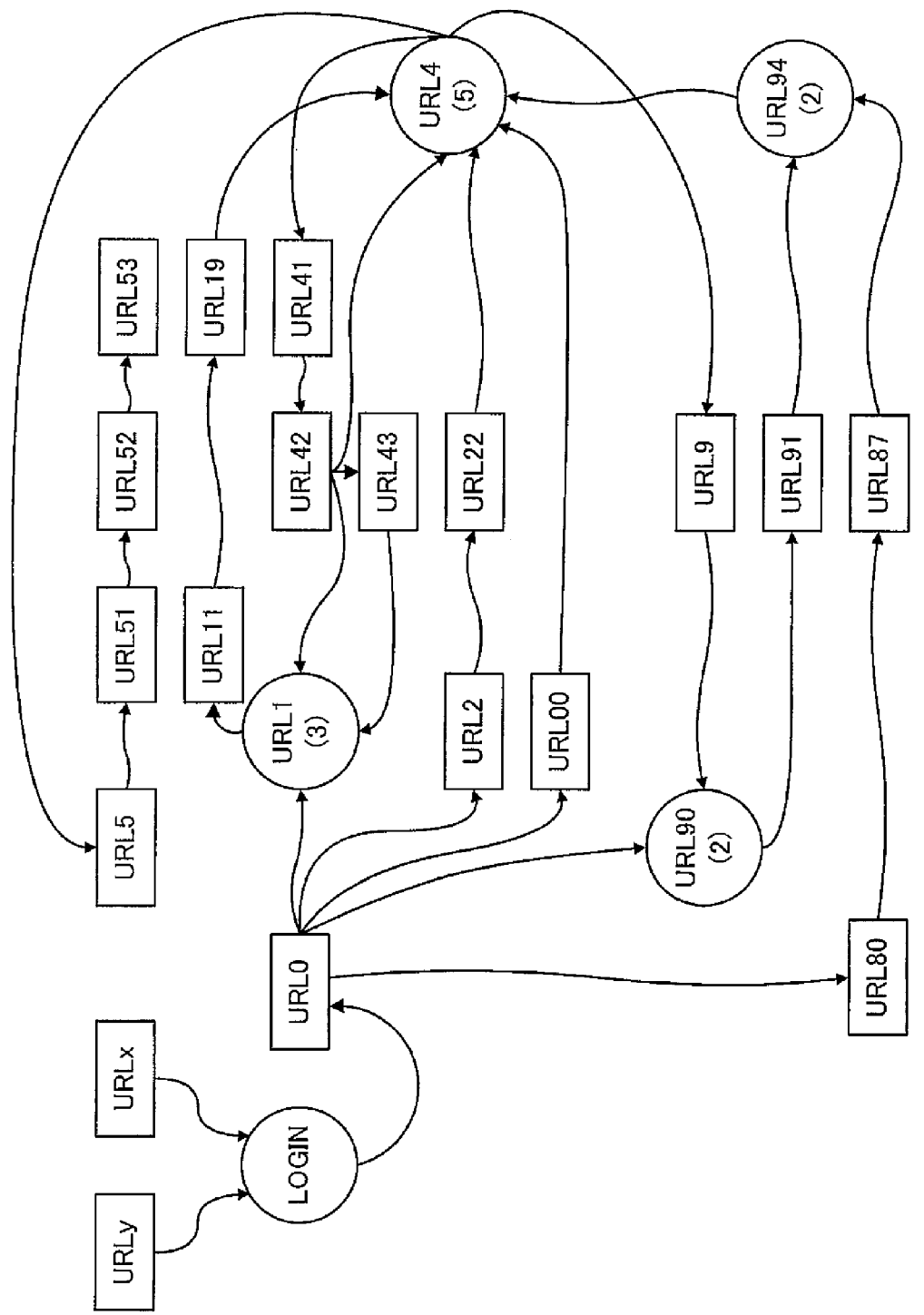
FIG. 11 is a diagram depicting a screen transition diagram obtained from the scenarios used in an embodiment.

FIG. 11 is a screen transition diagram depicting the screen transitions using the scenarios shown in FIG. 9B in an embodiment. Each screen with two or more transition source screens is illustrated with a circle. For each circled screen, the number of transition source screens is shown in parentheses. This screen transition diagram facilitates understanding of each value in the statistical information shown in FIG. 10.

Block S403 of FIG. 6.

In this block, the SI evaluation value calculation unit 44 calculates the SI value of each screen by using the aforementioned evaluation function designed to analyze SI screens.

In an embodiment, if "y" is the SI evaluation value, then a general form of the evaluation function may be defined, by use of a function "f", such as "y=f(the number of transition source screens, the number of transition destination screens, the number of appearances, the smallest number of transition screens, the system's known information)."

In an embodiment, a screen is likely to be an SI screen when its number of transition source screens is large. Further, a screen is expected to be a screen such as a menu screen when its number of transition destination screens is also large, while an SS screen is expected to be a screen where a series of loop processes starts, for example, when its number of transition destination screens is one or a small number. A screen is expected to be likely to be an SI screen when its smallest number of transition screens is small, while a screen is unlikely to be an SI screen when its smallest number of transition screens is large. In an embodiment, the system's known information may indicate if the screen of interest is known to be an SI or SS screen in advance based on system information, and this known information will be used without the need for additional analysis.

In an additional embodiment, the evaluation function may be defined as "y=the number of transition source screens," for example, instead of the above-described general form. In this case, the number of transition destination screens and the like do not need to be found in block S402 since they will not be used. Defining the evaluation function in this way has been proven to be effective in SI screen determination.

The SI evaluation value calculation unit 44 adds the SI evaluation value of each screen to the statistical information stored in the statistical information storage unit 43 in block S402.

Block S421 of FIG. 7.

In this block, the parameter acquisition unit 45 acquires the following parameters.

A first acquired parameter is the SI judgment criterion. The SI judgment criterion is a criterion for the SI evaluation values found by using the aforementioned evaluation function. Using a function "g", a criterion "c" is defined as "c=g(m,l,a)," where "m" is the target system's scale (e.g. the number of screens), "l" is the target system's screen transition characteristics, and "a" is a safety factor for determination. The criterion is arbitrarily determined while using a safety factor for determination. In an embodiment, the result from block S402 can be referred to in order to determine the criterion. That is, the criterion may be adjusted according to the processing result, and therefore the process may be started with a criterion having a large safety factor.

A second parameter is the shortening result judgment criterion, which will be described in detail below.

A third parameter is the playback rate adjustment criterion, which will be described in detail below.

Block S422 of FIG. 7.

In this block, the SI screen determination unit 46 determines that a screen is an SI screen if the screen's SI evaluation value calculated at block S403 is larger than the SI judgment criterion acquired at block S421. For example, given that the evaluation function is "y=the number of transition source screens" and the SI judgment criterion value is two, the screens "URL1," "URL4," "URL90," and "URL94" are determined to be SI screens since each of them has the transition source of two of more screens.

Note that each screen with an SI evaluation value larger than the SI judgment criterion is determined to be an SI screen even when the number of transition destination screens or the number of appearances is set to the SI evaluation value. On the other hand, each screen with an SI evaluation value smaller than the SI judgment criterion is determined to be an SI screen when the smallest number of transition screens is set as the SI evaluation value.

Block S423 of FIG. 7.

In this block, the scenario extraction unit 47 reads the scenario of each session that has already been active at the start point. The scenario extraction unit 47 reads the sessions that straddle the start point, i.e., the sessions containing requests before and after the start point, one by one as a target of the shortening process. Each session that has already ended before the start point does not need to be played back and therefore is not regarded as a target of the shortening process. Moreover, any scenario of each session that includes an authentication sequence in its trace after the start point does not need to be changed, is not regarded as a target of the shortening process, and is output as is to the load generation server 60.

Block S425 of FIG. 7.

At this block, the shortcut process unit 48 performs its shortcut shortening process on the scenario of the session.

In an embodiment, the shortcut shortening process refers to a process in which, when a session includes a pair of the same SI screens, each screen transition between those SI screens is deleted. The shortcut process unit 48 performs the shortcut process in the following sequence.

First, at A1, the shortcut process unit 48 sets the screen at the start point as a search start screen and the process proceeds to A2. At A2, the shortcut process unit 48 searches the scenario of the session backward from the search start screen for an SI screen. At A3, the shortcut process unit 48 determines whether or not an SI screen has been found. The process proceeds to A4 if there is a hit whereas the process ends if there is no hit.

At A4, the shortcut process unit 48 searches the scenario for the same SI screen forward from the authentication screen. Then, at A5, the shortcut process unit 48 determines whether or not the same SI screen has been found. The process proceeds to A6 if the same SI screen was found whereas the process proceeds to A7 if the same SI screen has not been found.

At A6, the shortcut process unit 48 deletes each screen transition between the SI screens, and then the process proceeds to A7.

At A7, the shortcut process unit 48 sets the hit SI screen as a new search start screen. Then, the process returns to A2 and continues until reaching the authentication screen.

Figure 12:
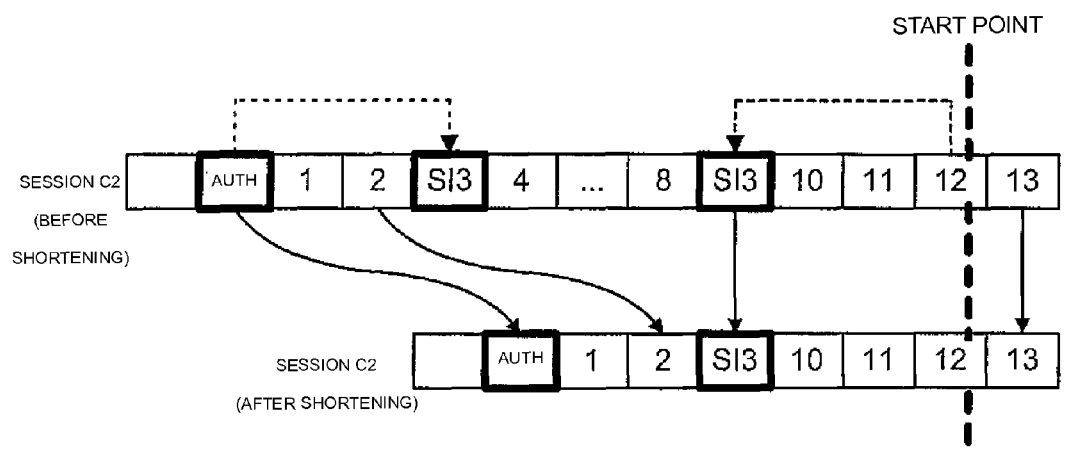
FIG. 12 is a diagram depicting a shortcut shortening process in an embodiment.

FIG. 12 is a diagram depicting a shortcut shortening process as described above.

The upper series of screens in FIG. 12 shows the scenario of a session C2 before the shortcut.

At A1, screen 12 is set as a search start screen.

As shown by an arrow with a broken line, at A2, the scenario is searched backward from screen 12 for an SI screen, and at A3, screen S13 is found.

As shown by an arrow with a dotted line, at A4, the scenario is searched forward from the authentication screen for the same screen as the hit SI screen, and at A5, another screen SI3 is found.

At A6, screens 4 through 8, which are between these two SI3 screens, are deleted from the session.

As a result, the scenario of the session C2 becomes the lower series of screens in FIG. 12. The correspondence between the upper and lower screen sequences is shown by arrows with solid lines for the authentication screen, screen 2, and one of the SI3 screens.

Block S426 of FIG. 7.

At this block, the shortcut process unit 48 evaluates whether or not the shortening in block S425 is sufficient. If the shortening is not sufficient, the shortcut process unit 48 performs the shortening process of block S428.

In order to determine if additional shortening is required, the shortcut process unit 48 counts the number of screens from the authentication screen to the start point in the shortened scenario and compares the number with the shortening result judgment criterion acquired at block S421.

The shortening result judgment criterion is set by using the number of screen transitions, or a multiple thereof, in a single service (i.e., the number of uninterrupted screen transitions) in the target system which includes between about 50% to about 80-90% of the whole service.

By adjusting the shortening result judgment criterion it is possible to adjust the priority of applying the shortcut of Block S425 and the grafting shortening process of step 428.

Block S427 of FIG. 7.

At this block, the shortcut process unit 48 saves result information on the result of the shortcut shortening process. In an embodiment, the shortcut process unit 48 stores the shortened scenario and also a flag indicating that the shortening process using a shortcut between SI screens has been performed. Moreover, the shortcut process unit 48 increments the count of sessions subjected to the shortening using a shortcut between SI screens, and updates the information on the number of screens up to the start point (e.g. the largest value, the smallest value, and the average value).

Block S428 of FIG. 7.

At this block, the grafting process unit 49 performs its grafting shortening process on the scenario of the session.

In an embodiment, the grafting shortening process refers to a process in which the screen transitions in the session between the authentication screen and an SI screen are replaced with the shortest screen transitions.

The grafting process unit 49 performs the grafting process in the following sequence.

First, at B1, the grafting process unit 49 sets the screen at the start point as a search start screen, and the process proceeds to B2.

At B2, the grafting process unit 49 searches the scenario of the session backwards starting from the search start screen for an SI screen. At B3, the grafting process unit 49 determines whether or not there is a hit for an SI screen. The process proceeds to B4 if there is a hit whereas the process ends if there is no hit.

At B4, the grafting process unit 49 reads the inequality flag of the hit SI screen from the statistical information stored in the statistical information storage unit 43. At B5, the grafting process unit 49 determines whether or not the inequality flag is 0. The process proceeds to B6 if the inequality flag is 0 whereas the process proceeds to B9 if the inequality flag is not 0.

At B6, the grafting process unit 49 reads the shortest screen transitions of the hit SI screen from the statistical information stored in the statistical information storage unit 43. At B7, the grafting process unit 49 determines whether or not the original screen transitions from the authentication screen to the SI screen are the same as the shortest screen transitions. The process proceeds to B8 if they are not the same whereas the process proceeds to B9 if they are the same.

At B8, the grafting process unit 49 deletes the original screen transitions from the authentication screen to the SI screen and replaces them with the shortest screen transitions and the process proceeds to B9.

At B9, the grafting process unit 49 sets the hit SI screen as a new search start screen. Then, the process returns to B2 and continues until reaching the authentication screen.

Figure 13:
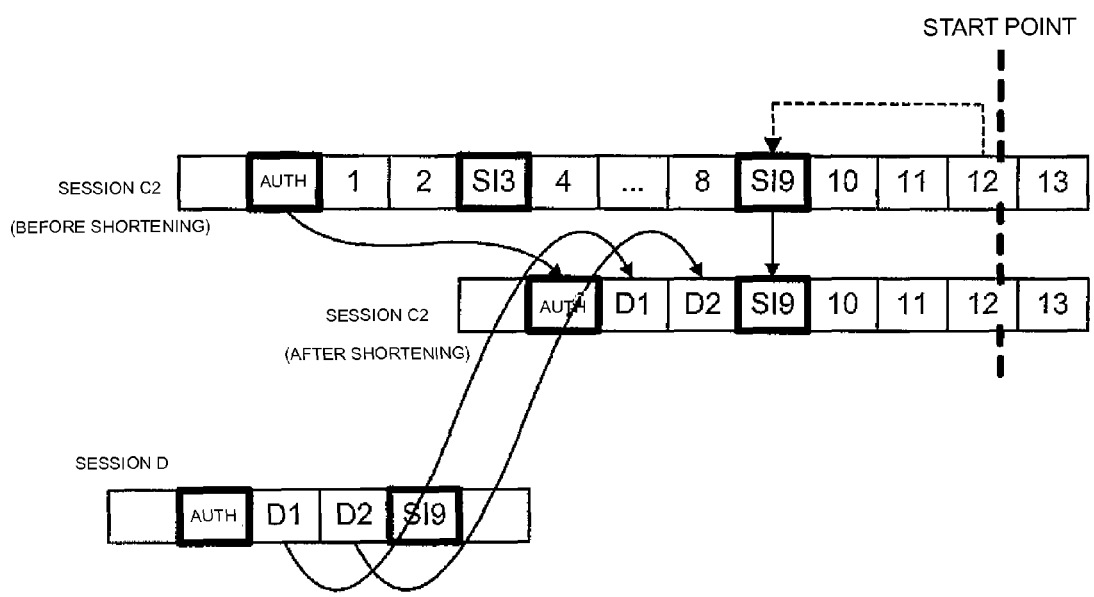
FIG. 13 is a diagram depicting a shortening process using grafting in an embodiment.

FIG. 13 is a diagram depicting a grafting shortening process as described above.

The upper series of screens in FIG. 13 shows the scenario of a session C2 before the grafting process.

At B1, a screen 12 is set as a search start screen.

As shown by an arrow with a broken line, at B2, the scenario is searched backward for an SI screen from the screen 12 and in B3, the SI screen SI9 is found.

At B4, the inequality flag of the screen SI9 is read. At B5, the inequality flag is determined to be 0. In B6, screens D1 and D2 between the authentication screen and the screen SI9 in a session D shown in the bottom series of screens in FIG. 13 are read as the shortest screen transitions between the authentication screen and the S19 screen.

At B7, the screens D1 and D2 are determined to not be the same as the screen transitions between the authentication screen and the screen SI9 in the session C2. Thus, at B8, screens 1, 2, SI3, and 4 . . . 8 between the authentication screen and the screen SI9 in the session C2 are deleted and replaced with the screens D1 and D2.

As a result the scenario of the session C2 becomes the series of scenes in the middle of FIG. 13.

Note that in this example, the SI screen found as a result of searching the scenario forward from the authentication screen is the screen SI3 which is different from the screen SI9, and therefore the shortcut shortening process cannot be performed on the session. For this reason, the scenario of the session is shortened by replacing the screen transitions between the authentication screen and the screen SI9 in this session with the recorded shortest screen transitions between the authentication screen and the screen SI9.

Block S429 of FIG. 7.

In this block, the grafting process unit 49 saves the result of the grafting shortening process. The grafting process unit 49 stores the shortened scenario and also a flag indicating that the shortening process using grafting with the shortest screen transitions has been performed. Moreover, the grafting process unit 49 increments the count of sessions subjected to the shortening process using grafting with the shortest screen transitions, and updates the information on the number of screens up to the start point (e.g. the largest value, the smallest value, and the average value).

In an embodiment, if the grafting shortening process is not performed, a flag indicating that no shortening process was performed is added to the scenario. The count of sessions that have not been subjected to the shortening process is incremented, and information on the number of screens up to the start point (e.g. the largest value, the smallest value, and the average value) is updated.

Each of the shortening process of block S425 and S428 of FIG. 7 shorten the screen transitions between the authentication screen and an SI screen at or before the start point. However, there may be cases where the results of the processing of the screen transitions between the SI screen immediately before the start point and the start point is already reflected in the server due to an event such as a data update in the database. In such cases, the scenario may be searched forward from the start point, and the screen transitions between the authentication screen and the first SI screen found at or after the start point may be set as a target of the shortening process.

Block S441 of FIG. 8.

In this block, once the shortening process on the target sessions is finished, the playback rate adjustment unit 51 adjusts the playback rates of the transactions.

This adjustment is made because the playback timings of the transactions in each session subjected to the shortening process differ from timings of the actual playback, and in order to match the timing of the original set of screens the timing need to be adjusted. For periods of time up to the start point, the transaction playback rate is set low for a time period having a large number of transactions. In other words, the time required for the transaction playback is lengthened. In contrast, for the period of time up to the start point, the transaction playback rate is set high for a time period having a small number of transactions. In other words, the time required for the transaction playback is shortened. This makes it possible to suppress the occurrence of transactions exceeding the capacity of the target system and also to shorten the playback time up to the start point. Note that for testing a backup system, an adjustment is also made such that the start time of each session subjected to the shortening process is set after the assumptive disaster time point.

Figure 14:
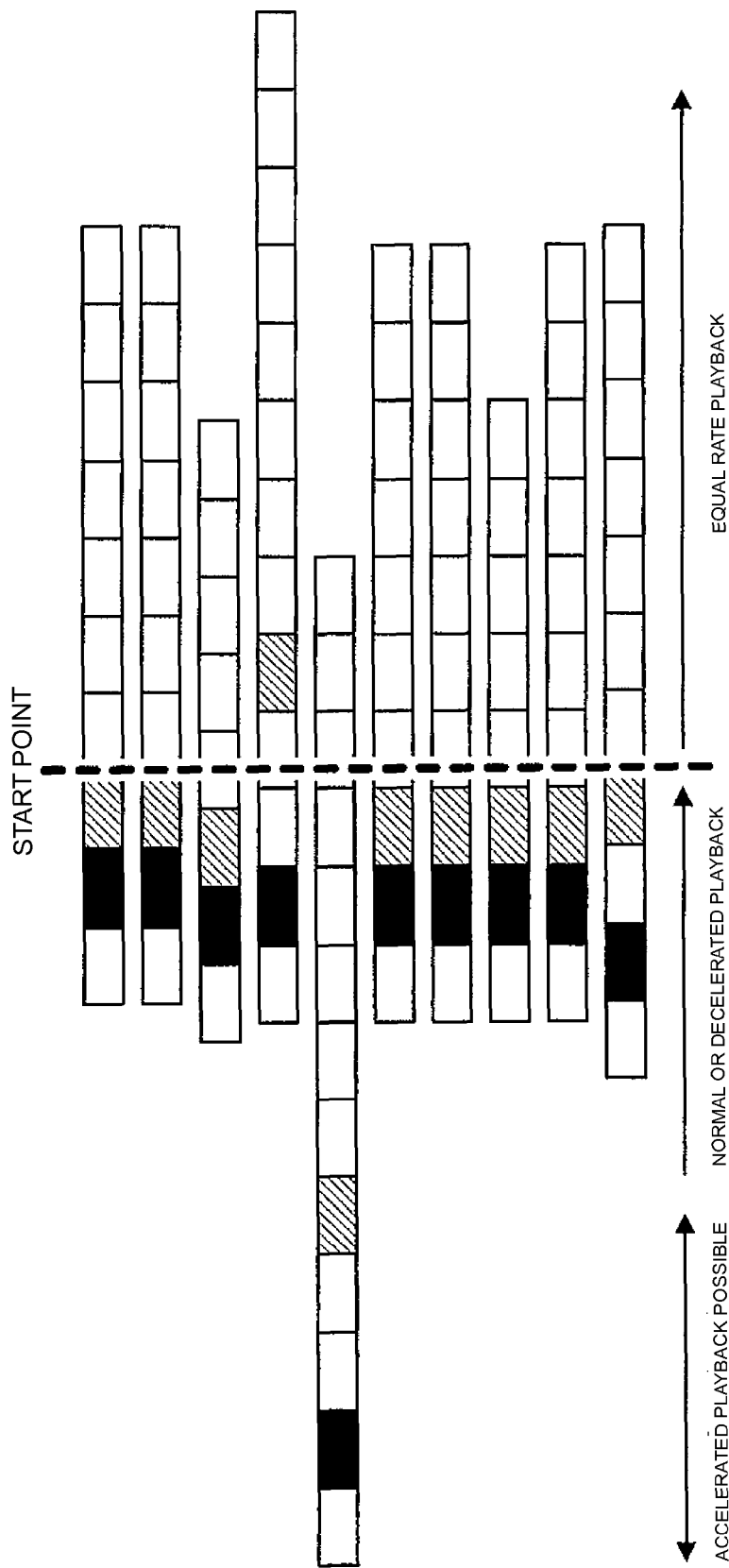
FIG. 14 is a diagram depicting the adjustment of the playback rates of transactions in an embodiment.

FIG. 14 is a diagram depicting how the playback rate adjustment is performed in an embodiment. In FIG. 14, each black square represents an authentication screen while each crosshatched square represents an SI screen.

In an embodiment, if the results of the shortening process are as shown in FIG. 14, then accelerated playback is possible during a time period while only one session is played back, as shown by one of the arrows at the bottom. Moreover, as the number of session to be played back increases, normal or decelerated playback is performed, as shown by one of the arrows at the bottom. Then, at and after the start point, playback at the same rate as that of the acquired actual transactions, (i.e. equal rate playback) is performed.

In an embodiment, the playback rate adjustment is performed as follows, for example.

During a time period where the number of transactions per unit time is equal to or smaller than x % of the maximum value, the playback is performed with an acceleration of x % as the upper limit.

During a time period where the number of transactions per unit time is equal to or larger than x % of the maximum value, the playback is performed with a deceleration not exceeding x %.

Note that x % is a system-specific safety factor defined by the user and is one of the parameters acquired at block S421. The safety factor is employed because there is a risk that heavy transactions overlapping each other may exceed the capacity of the target system even when the number of transactions is equal to or smaller than the maximum value when the load heaviness of each transaction is unknown. By lowering the safety factor such a risk may be reduced but the playback time up to the start point is increased.

Block S442 of FIG. 8.

At this block, the query unit 52 outputs the information obtained through the processes up to this point to the display mechanism 90d of FIG. 15 and the information is displayed on the display mechanism 90d.

In an embodiment, the following pieces of information are displayed.

As information about the result of the playback rate adjustment by the playback rate adjustment unit 51 is received, the playback time required up to the start point, and the number of transactions per unit time at each time point is displayed.

As information about the sessions subjected to the shortening process using shortcut between SI screens is received, the number of sessions subjected to such shortening process, the largest value, the smallest value, and the average value of the numbers of screens up to the start point in the sessions subjected to the shortening process is displayed.

As information about the sessions subjected to the shortening process using grafting with the shortest screen transitions is received, the number of sessions subjected to such shortening process, the largest value, the smallest value, and the average value of the numbers of screens up to the start point in the sessions subjected to the shortening process are displayed.

As information on the sessions subjected to no shortening process is received, the number of sessions subjected to no shortening process, the largest value, the smallest value, and the average value of the numbers of screens up to the start point in the sessions subjected to no shortening process is displayed.

Block S443 of FIG. 8.

At this block, the query unit 52 determines whether or not the user feels that sufficient shortening has done based on the information displayed at block S442.

If the user considers the shortening result insufficient, the process returns to Block S421 to have the user re-input the parameters and the processing is performed again based on the new parameters.

Block S444 of FIG. 8.

At this block, if the user considers the shortening result sufficient, the scenario output unit 53 outputs the scenarios of the shortened session stored in the result information storage unit 50 and the result of the playback rate adjustment obtained by the playback rate adjustment unit 51, which are then used as inputs to the load generation server 60 at the subsequent stage.

As described above, according to embodiments, the following features are provided to a testing system that performs tests using an equivalent diversity and load to those of a production environment. The test load may be executed by preparing a snapshot of a DB of a system in production operation at a start point and applying traces capturing network traffic, and by playing back the network traffics at and after the start point in a testing environment where the DB snapshot is restored.

The captured network traffic is analyzed, and a start screen (e.g. menu screen) is selected for which, assuming a user session has been established, any screen is likely to be able to transition to it.

A series of screen transitions are located which cannot be divided.

The undividable screen transitions are searched backwards from the start time point in each of a series of network traces sorted by user, and each screen transition at or after the start screen is played back as they are.

Each screen transition between a login screen and the start screen is shortened by applying one of two logics in descending order of reliability.

The one of the two logics is automatically selected by evaluating their shortening effects. Each executable playback scenario (traffic) is created and played back for each user session among the captured traffic which was already active at the start point.

This makes it possible to automatically create scenarios for testing which have conventionally been difficult to conduct.

In an embodiment, testing is conducted, for example, in a business system where there is no log-off from the service start time until the service finish time, or until a break time. Multiple services are executed sequentially by creating traffic immediately before a peak time without the playback of the entire traffics starting from the service start time.

Testing may be conducted in a disaster recovery system by creating traffic which assumes that a service is resumed immediately after a fault recovery.

In an embodiment, the shortcut shortening process is applied first, and if the result of this shortening process does not satisfy the shortening result judgment criteria, the grafting shortening process is applied. Note, however, that the present invention is not limited to this case. For example, the shortcut shortening process and the grafting shortening process may be applied in parallel, and the appropriate one of these processes may be selected by comparing their results. Alternatively, either of the shortcut shortening process or the grafting shortening process may be applied solely.

The hardware configuration of a computer to which this embodiment may be applied will be described. FIG. 15 is a diagram showing an example of the hardware configuration of such a computer in an embodiment. As shown in FIG. 15, the computer includes: a central processing unit (CPU) $90a$ as a calculation means; a main memory $90c$ connected to the CPU $90a$ through a motherboard (M/B) chipset $90b$; and the display mechanism $90d$ likewise connected to the CPU $90a$ through the M/B chipset $90b$. Moreover, a network interface $90f$, a magnetic disk device (e.g. a hard disk drive or "HDD") $90g$, an audio mechanism $90h$, a keyboard/mouse $90i$, and a flexible disk drive $90j$ are connected to the M/B chipset $90b$ through a bridge circuit $90e$.

In an embodiment, the components of FIG. 15 are connected through buses. For example, the CPU $90a$ and the M/B chipset $90b$ as well as the M/B chipset $90b$ and the main memory $90c$ are connected through a CPU bus. Moreover, the M/B chipset $90b$ and the display mechanism $90d$ may be connected through an accelerated graphics port (AGP). However, if the display mechanism $90d$ includes a video card compatible with Peripheral Component Interconnect Express (PCIe), the M/B chipset $90b$ and this video card are connected through a PCIe bus. Moreover, the bridge circuit $90e$ may use PCIe to connect the network interface $90f$. Further, a serial AT attachment (ATA), a parallel ATA, or a PCI bus, for example, can be used for the magnetic disk device $90g$. Furthermore, universal serial buses (USBs) can be used for the keyboard/mouse $90i$ and the flexible disk drive $90j$.

The present invention may be implemented entirely by hardware or entirely by software. Moreover, the present invention can be implemented by both hardware and software. Further, the present invention can be implemented as a computer, a data processing system, or a computer program. This computer program can be provided in the form of data stored in a computer-readable medium. Here, as a medium, an electronic, magnetic, optical, electromagnetic, infrared, or semiconductor system (or apparatus or device), or a propagation medium is conceivable. Moreover, examples of the computer-readable medium include a semiconductor or solid state memory, a magnetic tape, a removable computer diskette, a random access memory (RAM), a read-only memory (ROM), a rigid magnetic disk, and an optical disk. Current examples of the optical disk include a compact disk-read only memory (CD-ROM), a compact disk-read/write (CD-R/W), and a digital versatile disk (DVD).

While the present invention has been described above by using various embodiments, the technical scope of the present invention is not limited to the above embodiments. It is apparent to those skilled in the art that various changes can be made and alternative forms can be employed without departing from the spirit and scope of the present invention.

The invention claimed is:

1. An apparatus configured to create playback data for playback of transactions for testing a server, the apparatus comprising:
an extraction unit configured to extract recorded data, the recorded data comprising transactions executed in a session established between a client and the server at a designated point in time;
a creation unit configured to create playback data by performing a reduction process, the reduction process comprising deleting data related to certain transactions from the recorded data extracted by the extraction unit, the certain transactions executed between execution of a first transaction for establishing the session between the client and the server, and the execution of a second transaction belonging to a specific transaction group, the specific transaction group comprising transactions that have been executed on or before the designated point in time and including a transaction that is executed without requiring the execution of a predetermined prior transaction; and
an output unit configured to output the playback data created by the creation unit.

2. The apparatus according to claim 1, further comprising a storage unit configured to store the recorded data of a transaction group with a smallest number of transactions among a plurality of transaction groups executed in a plurality of sessions between the execution of the first transaction and the execution of the second transaction, wherein the creation unit creates the playback data using a reduction process that replaces the recorded data of the transactions executed between the execution of the first transaction and the execution of the second transaction with the recorded data stored in the storage unit.

3. The apparatus according to claim 1, wherein based on a third transaction having the same content as the second transaction, the third transaction executed within the session between the execution of the first transaction and the execution of the second transaction, the creation unit creates the playback data using a reduction process that deletes, from the recorded data, transactions executed between the execution of the third transaction and the execution of the second transaction.

4. The apparatus according to claim 1, wherein the creation unit creates the playback data using a reduction process that deletes, from the recorded data, the transactions executed between the execution of the first transaction and the execution of the second transaction.

5. The apparatus according to claim 1, further comprising a storage unit configured to store the recorded data of a transaction group, the recorded data comprising a smallest number of transactions among a plurality of transaction groups executed in a plurality of sessions between the execution of the first transaction and the execution of the second transaction, wherein based on a third transaction being executed in the session between the first transaction and the second transaction and including the same content as the second transaction, the creation unit creates a first playback data by a first reduction process that deletes, from the recorded data, recorded data of transactions executed between the execution of the third transaction and the execution of the second transaction, and the creation unit further creates a second playback data by a second reduction process, the second reduction process replacing the recorded data of the transactions executed between the execution of the first transaction and the execution of the second transaction in the recorded data, with the recorded data stored in the storage unit; and the output unit further configured to outputs information that includes an effect of a reduction by the first reduction process and an effect of the reduction by the second reduction process.

6. The apparatus according to claim 1, further comprising:
an accumulation unit configured to accumulate the recorded data of a plurality of transactions executed in a plurality of sessions; and
a determination unit configured to evaluate a transaction of a transaction group based on the recorded data accumulated in the accumulation unit.

7. The apparatus according to claim 6, wherein the determination unit evaluates the transaction of the transaction group based on at least one of:
a number of different transactions executed immediately before the transaction of the transaction group;
a number of different transactions executed immediately after the transaction of the transaction group;
a number of times the transaction of the transaction group is executed; and
a number of transactions executed between the execution of the first transaction and the execution of the second transaction,
wherein the number of different transactions are selected from the recorded data accumulated in the accumulation unit.

8. An apparatus configured to create playback data for playback of screens for testing a server, the apparatus comprising:
a first identification unit configured to identify a first screen for establishing a session between the client and the server;
a second identification unit configured to identify a second screen based on at least one of a number of different screens displayed immediately before the second screen, the number of different screens displayed immediately after the second screen, a number of times of displaying the second screen, and a number of screens displayed between displaying the first screen and displaying the second screen, wherein display of the second screen does not require a transition from a predetermined prior screen;
a storage unit configured to store recorded data of a screen group with a smallest number of screens among a plurality of screen groups displayed between displaying the first screen and displaying the second screen in a plurality of sessions;
an extraction unit configured to extract recorded data, the recorded data comprising a plurality of screens displayed in a particular session established between the client and the server at a designated point of time;
a creation unit configured to create playback data, the playback data including recorded data of screens displayed between the first screen and the second screen, wherein the screens belonging to the screen groups and displayed before the designated point of time are replaced with the stored recorded data; and
an output unit configured to output the playback data created by the creation unit.

9. A method for creating playback data for playback of transactions for testing a server, the method comprising:
   extracting recorded data, the recorded data comprising transactions executed in a session established between a client and the server at a designated point in time;
   creating, on a processor, playback data by performing a reduction process, the reduction process comprising deleting data related to certain transactions from the recorded data extracted by the extraction unit, the certain transactions executed between execution of a first transaction for establishing the session between the client and the server, and the execution of a second transaction belonging to a specific transaction group, the specific transaction group comprising transactions that have been executed on or before the designated point in time and including a transaction that is executed without requiring the execution of a predetermined prior transaction; and
   outputting the playback data.

10. The method according to claim 9, further comprising:
   storing the recorded data of a transaction group with a smallest number of transactions among a plurality of transaction groups executed in a plurality of sessions between the execution of the first transaction and the execution of the second transaction,
   wherein the reduction process replaces the recorded data of the transactions executed between the execution of the first transaction and the execution of the second transaction with the stored recorded data.

11. The method according to claim 9, wherein the reduction process deletes, from the recorded data, transactions executed between the execution of a third transaction and the execution of the second transaction, based on the third transaction having the same content as the second transaction, the third transaction executed between the execution of the first transaction and the execution of the second transaction.

12. The method according to claim 9, wherein the reduction process deletes, from the recorded data, transactions executed between the execution of the first transaction and the execution of the second transaction.

13. The method according to claim 9, further comprising:
   accumulating recorded data of a plurality of transactions executed in a plurality of sessions; and
   evaluating a transaction of a transaction group based on the accumulated recorded data accumulated.

14. The method according to claim 13, further comprising evaluating the transaction of the transaction group based on at least one of:
   a number of different transactions executed immediately before the transaction of the transaction group;
   a number of different transactions executed immediately after the transaction of the transaction group;
   a number of times the transaction of the transaction group is executed; and
   a number of transactions executed between the execution of the first transaction and the execution of the second transaction,
   wherein the number of different transactions are selected from the recorded data accumulated in the accumulation unit.

15. A non-transitory computer program product to create playback data for playback of transactions for testing a server, the computer program product comprising:
   a computer readable storage medium having computer readable program code embodied therewith, the computer readable program code comprising:
   computer readable program code configured for:
   extracting recorded data, the recorded data comprising transactions executed in a session established between a client and the server at a designated point in time;
   creating playback data by performing a reduction process, the reduction process comprising deleting data related to certain transactions from the extracted recorded data, the certain transactions executed between execution of a first transaction for establishing the session between the client and the server, and the execution of a second transaction belonging to a specific transaction group, the specific transaction group comprising transactions that have been executed on or before the designated point in time and including a transaction that is executed without requiring the execution of a predetermined prior transaction; and
   outputting the playback data.

16. The computer program product according to claim 15, wherein the computer readable program code is further configured for:
   storing the recorded data of a transaction group with a smallest number of transactions among a plurality of transaction groups executed in a plurality of sessions between the execution of the first transaction and the execution of the second transaction,
   wherein creating the playback data comprises performing a reduction process, the reduction process replacing the recorded data of the transactions executed between the execution of the first transaction and the execution of the second transaction with the stored recorded data.

17. The computer program product according to claim 15, wherein the computer readable program code is further configured for creating the playback data using a reduction process that deletes, from the recorded data, transactions executed between the execution of the third transaction and the execution of the second transaction, based on a third transaction having the same content as the second transaction, the third transaction executed within the session between the execution of the first transaction and the execution of the second transaction.

18. The computer program product according to claim 15, wherein the computer readable program code is further configured for creating the playback data using a reduction process that deletes, from the recorded data, the transactions executed between the execution of the first transaction and the execution of the second transaction.

19. The computer program product according to claim 15, wherein the computer readable program code is further configured for:
   storing the recorded data of a transaction group, the recorded data comprising a smallest number of transactions among a plurality of transaction groups executed in a plurality of sessions between the execution of the first transaction and the execution of the second transaction;
   wherein based on a third transaction being executed in the session between the first transaction and the second transaction and including the same content as the second transaction, performing:
   creating a first playback data by performing a first reduction process that deletes, from the recorded data, the recorded data of transactions executed between the execution of the third transaction and the execution of the second transaction; and
   creating a second playback data by performing a second reduction process, the second reduction process replacing the recorded data of the transactions executed between the execution of the first transaction and the execution of the second transaction in the recorded data, with the stored recorded data stored in the storage unit; and outputting information, the information including an effect of a reduction by the first reduction process and an effect of the reduction by the second reduction process.

20. The computer program product according to claim 15, wherein the computer readable program code is further configured for:

accumulating recorded data of a plurality of transactions executed in a plurality of sessions; and evaluating a transaction of a transaction group based on the accumulated recorded data accumulated.

* * * * *